US006253147B1

(12) United States Patent
Greenstein

(10) Patent No.: US 6,253,147 B1
(45) Date of Patent: Jun. 26, 2001

(54) REAL TIME TERTIARY OPERATION FOR RESOLVING IRREGULARITIES IN AIRCRAFT OPERATIONS

(75) Inventor: Ira Louis Greenstein, Austin, TX (US)

(73) Assignee: CALEB Technologies Corp., Austin, TX (US)

( * ) Notice: Subject to any disclaimer, the term of this patent is extended or adjusted under 35 U.S.C. 154(b) by 0 days.

(21) Appl. No.: 09/678,958

(22) Filed: Oct. 4, 2000

(51) Int. Cl.[7] .............................. G01S 3/02; G01S 13/91

(52) U.S. Cl. ....................... 701/202; 701/210; 244/114 R

(58) Field of Search .................................... 701/202, 209, 701/210, 120, 207, 3, 11; 340/953, 961; 342/36, 33, 34, 450, 457; 348/116, 117; 244/114 R; 708/625, 653, 654, 801, 270, 230, 200

(56) References Cited

U.S. PATENT DOCUMENTS 5,077,673 * 12/1991 Brodegard et al. .................. 364/461
5,157,615 * 10/1992 Brodegard et al. .................. 364/461
5,319,374 * 6/1994 Desai et al. .......................... 342/387

* cited by examiner

*Primary Examiner*—Tan Nguyen
*Assistant Examiner*—Dalena Tran
(74) *Attorney, Agent, or Firm*—Gerald E. Lester

(57) ABSTRACT

A method and system for conducting local neighborhood searches among three or more aircraft routes to cure any irregularity in one of the aircraft routes, in which states of Binary Operations are stored, time and space feasibility tables are created from the stored states, and Tertiary Operations responsive to data stored in the feasibility tables are performed on the three or more entities to effect a repair.

13 Claims, 14 Drawing Sheets

REAL TIME TERTIARY OPERATION FOR RESOLVING IRREGULARITIES IN AIRCRAFT OPERATIONS

FIELD OF THE INVENTION

A method and system for using tertiary operations in repairing Grounded Aircraft Routes, and more particularly a method and system for swapping flight sequences among a Grounded Aircraft Route, and two Available Aircraft Routes to cure the irregularities in the Grounded Aircraft Route in real time while maintaining time and space feasibility in both the Available Aircraft Routes and the Grounded Aircraft Route.

RELATED APPLICATION

U.S. patent application Ser. No. 09/364157 filed on Jul. 30, 1999, and assigned to the assignee of the present invention.

BACKGROUND OF THE INVENTION

U.S. patent application Ser. No. 09/364157, which is assigned to the assignee of the present application, discloses a real time aircraft optimization engine that uses Unary, Binary, and Three-Way Operations for repairing a Grounded Aircraft Route, a route of an aircraft which has been grounded for a specific period of time. The Unary Operations cancel and uncancel or do nothing to the Grounded Aircraft Routes. The Binary Operations repair a Grounded Aircraft Route through actions performed with one Available Aircraft Route, a route of an aircraft which is available for use in a solution of a flight schedule irregularity. Tertiary Operations are used to repair a Grounded Aircraft Route through actions with two Available Aircraft Routes. The system in which the aircraft optimization engine of the above patent application operates is illustrated in FIG. 1.

Referring to FIG. 1, a functional block diagram of the environment in which the invention operates is shown, where a user interface referred to as an Optimization Server 1 is in electrical communication with a user by way of a bi-directional communication path 2, and receives a request for optimal solutions to a specific flight schedule disruption. In response to the request, the Optimization Server 1 initializes an Aircraft Optimization Engine 3 by way of a bi-directional communication path 4, and provides the Aircraft Optimization Engine 3 an Aircraft Problem Specification. The Aircraft Optimization Engine 3 processes the Aircraft Problem Specification and generates a set of optimal solutions including aircraft reassignments and flight modifications to overcome the disruption. The solutions are transmitted over communication path 4, and through the Optimization Server 1 and bi-directional path 2 to the user.

The Aircraft Optimization Engine 3 further initializes a Crew Optimization Engine 5 by way of a bi-directional communication path 6 to determine whether the optimal flight solutions are efficiently supported by flight and service crews.

During operation, the Aircraft Optimization Engine 3 and the Crew Optimization Engine communicate by way of bi-directional communication paths 10 and 11, respectively, with a memory system such as a disk storage unit 9 having stored therein memory objects containing all of the data used by the engines to solve problems. For example, the memory objects include instances of Station, Market, Aircraft, Fleet, Subfleet, Maintenance, and Flight classes, and are created and updated by the Data Collection Unit 12 and the Data Update Unit 13, respectively.

The Data Collection Unit 12 receives complete information for stations, markets, aircraft, fleets, subfleets, maintenance, and flights from the user by way of bi-directional communication path 14. Thereafter, the Data Collection Unit 12 creates memory objects which are supplied by way of a bi-directional communication path 15 for storage in the disk storage unit 9, and at memory locations specified by a Memory Mapping Unit 16 along a bi-directional communication path 17. Further, the Data Update Unit 13 receives revisions to the memory objects from the user over a bi-directional communication path 18, and supplies corrections through a bi-directional communication path 19 to the objects identified by the Memory Mapping Unit 16.

The Memory Mapping Unit 16 receives control signals from the user over a bi-directional communication path 20, and in response thereto identifies the addresses of the memory objects in the disk storage unit 9 which are being operated upon. By means of the Memory Mapping Unit 16 and the Data Update Unit 13, the user is able to keep the data stored in the Disk Storage Unit 9 current with the data being supplied to the user by way of communication path 2.

At any given time, the memory objects of the Disk Storage Unit 9 reflect the existing flight environment, including identifications of protected flights which are not to be canceled or delayed; flight sequences or routes for each aircraft; the stations or airports to be used by the aircraft; the fleets and subfleets assigned to each station; station closure times; fleet arrival and departure curfews; inviolable and violable maintenance schedules; aircraft seat capacities; fleet operational ground times; operations costs; flight disruption costs; subfleet disruption costs; and revenue and passenger information for each scheduled flight.

The Aircraft Problem Specification received by the Aircraft Optimization Engine 3 upon being initialized by a request from the user, further includes the identification of grounded aircraft; the stations where aircraft groundings have occurred; the start and end times of each of such groundings; the identification of available aircraft; the identification of protected flights; recovery period start and end times; maximum allowable flight delays; and flight cancellation and ferry creation restraints.

Based upon the above information a solution comprised of flight delays and cancellations, Ferry Flight creations, as well as aircraft reassignments is produced In the prior art invention disclosed in the above patent application, a solution is sought by first executing Unary Operations, then Binary Operations, and lastly Three-Way Operations until all Available Aircraft Routes have been processed to achieve solutions for all Grounded Aircraft Routes. See FIG. 3 of the above patent application. More particularly, Available Aircraft Routes are chosen two at a time, and a local neighborhood search is performed (i.e., the above set of operations are performed on the Grounded Aircraft Route to identify time and space feasible solutions), and thereafter two additional Available Aircraft Routes are chosen and the process repeated.

One Binary Operation that is disclosed is a Swap Operation in which flight sequences of one route are replaced with flight sequences of another route. A Three-Way Swap also is disclosed which is comprised of removing a first sequence of flights from a Grounded Aircraft Route, removing a second sequence of flights from a first Available Aircraft Route, removing a third sequence of flights from a second Available Aircraft Route, replacing the first sequence with the second sequence of flights, replacing the second sequence with the third sequence of flights, and replacing the third sequence with the first sequence of flights.

The above Three-Way Swap Operation requires three entities to be considered through a brute force method which is time consuming because three flights are considered at a same time, which is not tolerable in an environment demanding real time solutions such as occurs in aircraft flight schedules. In order to alleviate this problem, a solution is sought which would reduce problem complexity to a consideration of only two aircraft at a time by taking advantage of conditions found while performing Binary Operations that could be used in Tertiary Operations including Three-Way Swap Operations in accordance with the present invention. That is certain states found while performing Binary Operations are later used in Tertiary Operations in real time.

SUMMARY OF THE INVENTION

The definitions set forth in the Description of Preferred Embodiments and U.S. patent application Ser. No. 09/364157 apply to this sunmmary.

An improved method for conducting local neighborhood searches among three or more aircraft routes to cure any irregularity in a Grounded Aircraft Route, where states of previously executed Binary Operations performed on the Grounded Aircraft Route and Available Aircraft Routes are stored, time and space feasibility tables are created from the stored values, and Tertiary Operations (Three-Way Swap Operations and other operations conducted on three aircraft routes in accordance with the invention) related to said feasibility tables then are conducted on the Grounded Aircraft Route and Available Aircraft Routes to reconfigure each of the aircraft routes to effect a repair to the Grounded Aircraft Route in real time.

In one aspect of the invention, each flight sequence or subroute which is moved or swapped among aircraft routes must be time and space feasible. Further, for a Binary Operation to be feasible, both aFeas and gFeas must have a Boolean value of true. With Three-Way Swap Operations, only one of aFeas and gFeas need have a Boolean value of true. Other Tertiary Operations may have different combinations of aFeas and gFeas Boolean values.

In a second aspect of the invention, time and space feasible table pairs are generated from gFeas and aFeas values determined from Binary Operations conducted on a Grounded Aircraft Route and plural Available Aircraft Routes, and the tables are searched for matching Grounded Route Indices (gH,gT) to indicate that a Tertiary Operation is feasible. No additional evaluations except feasibility between Available Aircraft Routes need take place. Each entry in the tables captures the positions of the subroutes for both the Grounded Aircraft and an Available Aircraft that were used to perform a prior Binary Operation.

In another aspect of the invention, a Grounded Feasible Table and an Available Feasible Table are generated from known values of aFeas and gFeas, and the tables are searched for matching Grounded Route Indices (gH,gT) to indicate that a Three-Way Swap Operation is feasible. No additional evaluations except feasibility between Available Aircraft Routes need take place. Each entry in the tables captures the positions of the subroutes for both the Grounded Aircraft and an Available Aircraft that were used to perform a prior Binary Operation.

In a further aspect of the invention, Tertiary Operations include a Three-Way Swap Operation, and variants thereof which may consist of a Three-Way Swap Operation and another operation. Pivot Points occurring in either a Grounded Subroute or an Available Subroute that are produced by such a variant may be represented in one or both of the feasible tables needed for Tertiary Operations.

In still another aspect of the invention, each feasible table pair generated from values of aFeas and gFeas determined from Binary Operations conducted on a Grounded Aircraft Route and plural Available Aircraft Routes is specific to a particular Tertiary Operation. If either table contains no data, that particular Tertiary Operation is not performed. If both tables are populated, then that particular Tertiary Operation is performed to create new ones of the Grounded Aircraft Route, and Available Aircraft Routes upon which the operation was conducted.

In a still further aspect of the invention, certain of the Binary Operations conducted on the Grounded Aircraft Route, and the Available Aircraft Routes are detected to determine which Tertiary Operation tables will be created, and hence which Tertiary Operations will be performed.

In yet another aspect of the invention, an N-Way Swap Operation is provided for conducting a local neighborhood search of a Grounded Aircraft Route and N-1 Available Aircraft Routes to swap time and space feasible sequences of flights among all N routes to repair the Grounded Aircraft Route, where N is any whole number greater than or equal to 3.

BRIEF DESCRIPTION OF THE DRAWINGS

Additional objects, features and advantages of the present invention will become apparent from the following detailed description when read in conjunction with the accompanying drawings in which.

DESCRIPTION OF PREFERRED EMBODIMENTS

Figure 1:
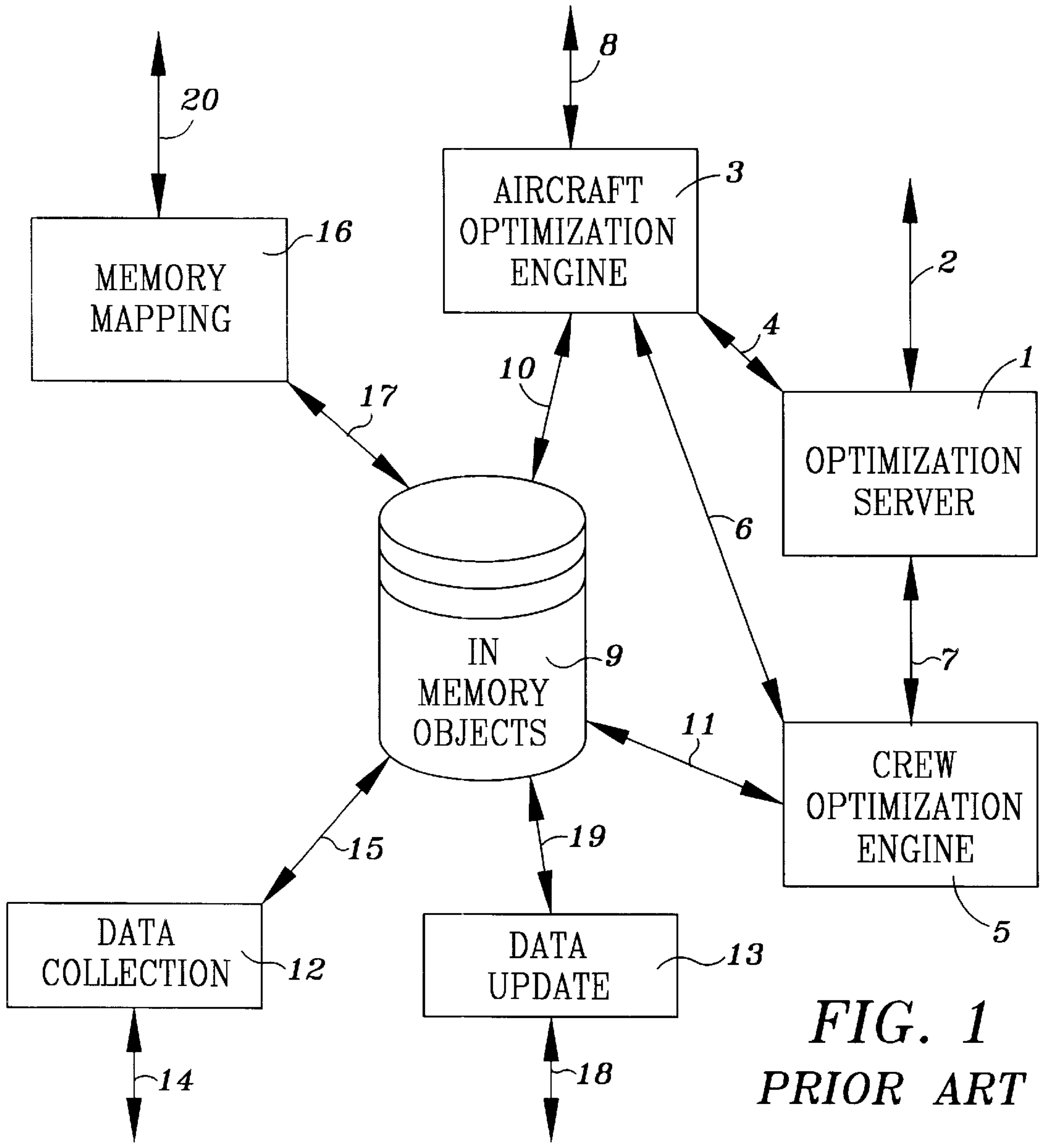
FIG. 1 PRIOR ART
FIG. 1 is a functional block diagram of a prior art system in which an aircraft optimization engine operates.

Preferred embodiments of the invention will now be described with reference to the accompanying drawings.

DEFINITIONS

The following definitions, whether occurring with capitalization or in lower case, are used consistently throughout this specification in disclosing the invention. Those definitions used but not specifically defined herein are taken from U.S. patent application Ser. No. 09/364157.

Tertiary Operation includes within the scope of its definition a Three-Way Swap Operation and variants thereof which are in conformance with the present invention.

Neighborhood means a set of solutions derived through the combination of operations that may be performed on a Grounded Aircraft Route.

Grounded Aircraft Route means the route of an aircraft grounded for a specific period of time.

Available Aircraft Route means the route of an aircraft that is available for use in a proposed solution to a flight schedule problem. That is, the set of grounded aircraft is a subset of the available aircraft set.

Phantom Route means a sequence of flights that are canceled during solution generation.

Source Route means Grounded Aircraft Route.

Target Route means Available Aircraft Route.

Available Subroute means one or more flight segments of an Available Aircraft Route.

Grounded Subroute means one or more flight segments of a Grounded Aircraft Route.

Flight Segment means part of a subroute.

Pivot point refers to the point at which a subroute is split into two subroutes. Only one pivot point may occur in any subroute.

Real Time as used herein means that as a result of operations irregularities being reduced in complexity, multiple solutions to an operations problem may be created in less than a minute, and usually in mere seconds, even when the number of Available Flights considered in a proposed solution increases beyond two.

A Cancel Operation is an operation which cancels one or more flight segments from a route.

A Move Operation is comprised of the removal of one or more flight segments from a source route, and the insertion of the flight segments in a target route.

Add Move Available Candidate Operation generates a table entry, which is comprised of a removed sequence of flights from a source route and an intersection of a target route.

Add Move And Cancel Available Candidate Operation generates a table entry, which is comprised of a removed sequence of flights from a source route, and a cancelled sequence of flights from a target route that is replaced by the removed sequence of flights from the source route.

Add Move And Cancel Grounded Candidate Operation generates a table entry, which is comprised of a removed sequence of flights from a source route, an interjection of part of the removed sequence into a target route, and the cancellation of the remainder of the removed sequence.

Add Swap Candidate Operation generates a table entry, which is comprised of a removed sequence of flights from a source route that is inserted into a target route, and a removed sequence of flights from the target route that is inserted into the source route.

Add Swap And Cancel Available Candidate Operation generates a table entry, which is comprised of a removed sequence of flights from a source route that is inserted into a target route, a removed sequence of flights from the target route that is inserted into the source route, and the cancellation of all remaining flight sequences from the target route.

Add Swap And Cancel Grounded Candidate Operation generates a table entry, which is comprised of a removed sequence of flights from a source route that is inserted into a target route, a removed sequence of flights from the target route that is inserted into the source route, and the cancellation of all remaining flight sequences from the source route.

Wherever the term "Grounded" is used, this equates to the term "source". Wherever the term "Available" is used, it equates to the term "target".

Add Swap And Cancel Available And Grounded Candidate Operation generates a table entry, which is comprised of a removed sequence of flights from a source route that is inserted into a target route, a removed sequence of flights from the target route that is inserted into the source route, the cancellation of all remaining flight sequences from the source route and the target route.

Figure 7A:
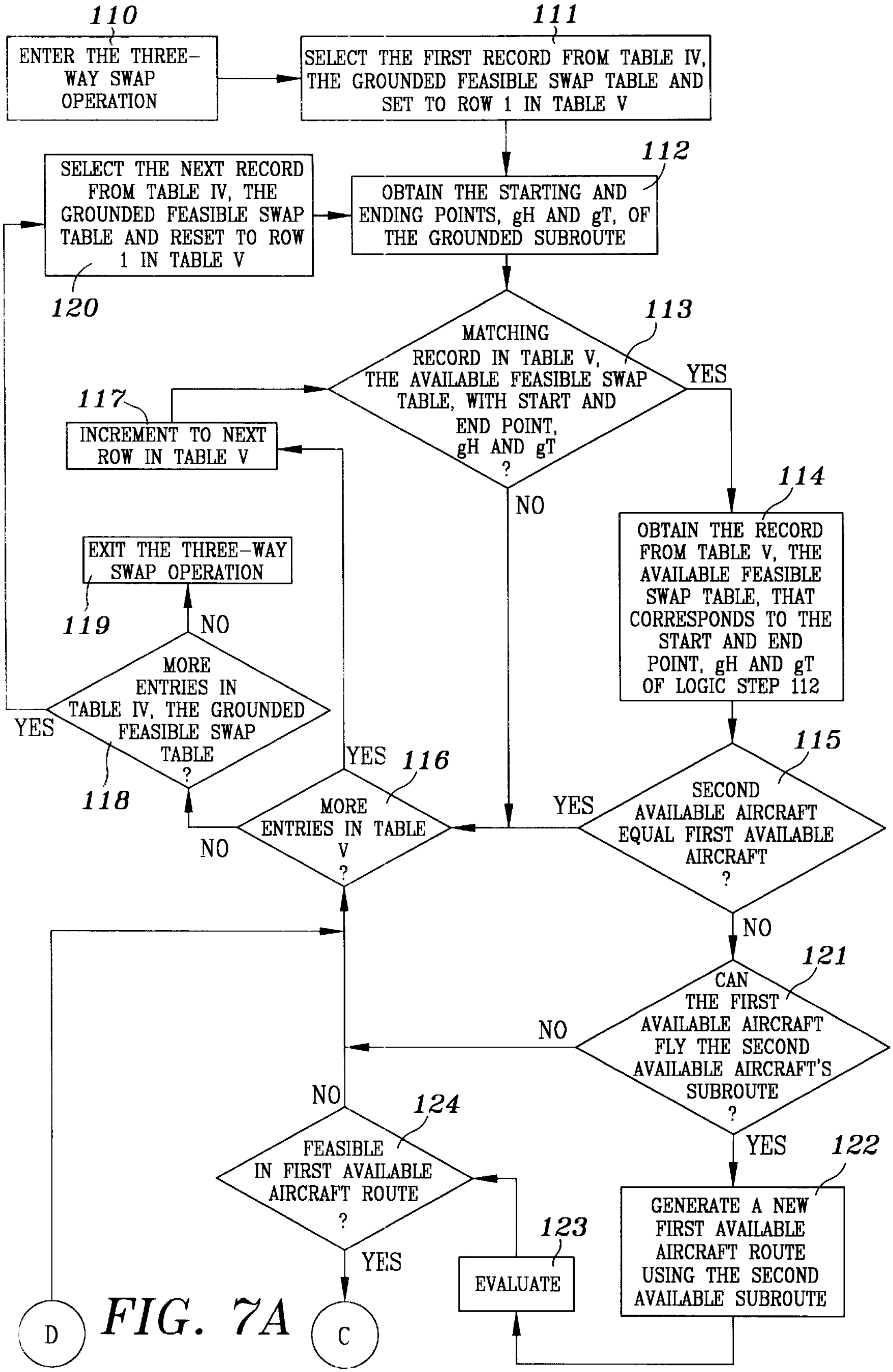
FIGS. 7A and 7B are logic flow diagrams of the invention in executing a Three-Way Swap Operation in accordance with the present invention.

There are eleven operations that perform the Tertiary Operations comprised of a Three-Way Swap Operation in accordance with the invention, and other operations conducted on three aircraft routes:

Three-Way Swap Operation in accordance with the present invention is comprised of the removal of a first sequence of flights from a Grounded Aircraft Route, the removal of a second sequence of flights from a first Available Aircraft Route, the removal of a third sequence of flights from a second Available Aircraft Route, the replacement of the first sequence with the second sequence, the replacement of the second sequence with the third sequence, and the replacement of the third sequence with the first sequence, wherein each of the above steps occur through determining when Binary Operations have been performed, capturing the state of those operations, creating a Grounded Feasible Table and an Available Feasible Table based upon such states, and thereafter proceeding in accordance with the logic flow of FIGS. 7A and &B.

Three-Way Move With Available Cancel And Standby Operation is comprised of the removal of a first sequence of flights from a Grounded Aircraft Route, the removal of a second sequence of flights from a first Available Aircraft Route, the replacement of the second sequence with the first sequence, and the insertion of the second sequence into a second Available Aircraft Route.

Three-Way Swap With Available Cancel And Standby Operation is comprised of the removal of a first sequence of flights from a Grounded Aircraft Route, the removal of a second sequence of flights from a first Available Aircraft Route, the replacement of the first sequence with a portion of the second sequence, the replacement of the second sequence with the first sequence, and the insertion of the remaining portion of the second sequence into a second Available Aircraft Route.

Three-Way Move With Grounded Cancel And Standby Operation is comprised of the removal of a first sequence of flights from a Grounded Aircraft Route, the insertion of a portion the first sequence into a first Available Aircraft Route, and the insertion of the remaining portion of the first sequence into a second Available Aircraft Route.

Three-Way Swap With Grounded Cancel And Standby Operation is comprised of the removal of a first sequence of flights from a Grounded Aircraft Route, the removal of a second sequence of flights from a first Available Aircraft Route, the replacement of the first sequence with the second sequence, the replacement of the second sequence with a portion of the first sequence, and the insertion of the remaining portion of the first sequence into a second Available Aircraft Route.

Three-Way Swap With Move Operation is comprised of the removal of a first sequence of flights from a Grounded Aircraft Route, the removal of a second sequence of flights from a second Available Aircraft Route, the replacement of the second sequence with the first sequence, and the insertion of the second sequence into a first Available Aircraft Route.

Three-Way Swap The Dw Way Operation is comprised of the removal of a first sequence of flights from a Grounded Aircraft Route, the removal of a second sequence of flights from a first Available Aircraft Route, the removal of a third sequence of flights from a second Available Aircraft Route, the replacement of the first sequence with the second sequence, the replacement of the second sequence with the third sequence as well as part of the first sequence, and the replacement of the third sequence with the remaining part of the first sequence.

Three-Way Swap And Cancel Available And Grounded Operation is comprised of the removal of a first sequence of flights from a Grounded Aircraft Route, the removal of a second sequence of flights from a first Available Aircraft Route, the removal of a third sequence of flights from a second Available Aircraft Route, the replacement of the first sequence with part of the second sequence, the replacement of the second sequence with the third sequence, and the replacement of the third sequence with part of the first sequence, and the cancellation of the remainder of the first sequence as well as the cancellation of the remainder of the second sequence.

Three-Way Swap And Cancel Available And Second Operation is comprised of the removal of a first sequence of flights from a Grounded Aircraft Route, the removal of a second sequence of flights from a first Available Aircraft Route, the removal of a third sequence of flights from a second Available Aircraft Route, the replacement of the first sequence with part of the second sequence, the replacement of the second sequence with part of the third sequence, and the replacement of the third sequence with the first sequence, and the cancellation of the remainder of the second sequence as well as the cancellation of the remainder of the third sequence.

Three-Way Swap And Cancel Available Operation is comprised of the removal of a first sequence of flights from a Grounded Aircraft Route, the removal of a second sequence of flights from a first Available Aircraft Route, the removal of a third sequence of flights from a second Available Aircraft Route, the replacement of the first sequence with part of the second sequence, the replacement of the second sequence with the third sequence, and the replacement of the third sequence with the first sequence, and the cancellation of the remainder of the second sequence.

Three-Way Swap And Cancel Grounded Operation is comprised of the removal of a first sequence of flights from a Grounded Aircraft Route, the removal of a second sequence of flights from a first Available Aircraft Route, the removal of a third sequence of flights from a second Available Aircraft Route, the replacement of the first sequence with the second sequence, the replacement of the second sequence with the third sequence, the replacement of the third sequence with part of the first sequence, and the cancellation of the remainder of the first sequence.

DESCRIPTIONS

In the following descriptions, the claimed invention is disclosed in detail through use of a combination of definitions, tables, logic flow diagrams, textual guidance, and examples to provide the know-how necessary to implement and perform the identified Tertiary Operations as well as those which will be identified only through flight irregularities not yet addressed.

It is to be understood that the Tertiary Operations described herein depend upon Binary Operations previously being performed by the aircraft optimization engine disclosed and claimed in U.S. patent application Ser. No. 09/364157.

As before stated, a prior art Three-Way Swap Operation is a brute force method comprised of the removal of a first sequence of flights from a Grounded Aircraft Route, the removal of a second sequence of flights from a first Available Aircraft Route, the removal of a third sequence of flights from a second Available Aircraft Route, the replacement of the first sequence with the second sequence, the replacement of the second sequence with the third sequence, and the replacement of the third sequence with the first sequence.

Figure 2:
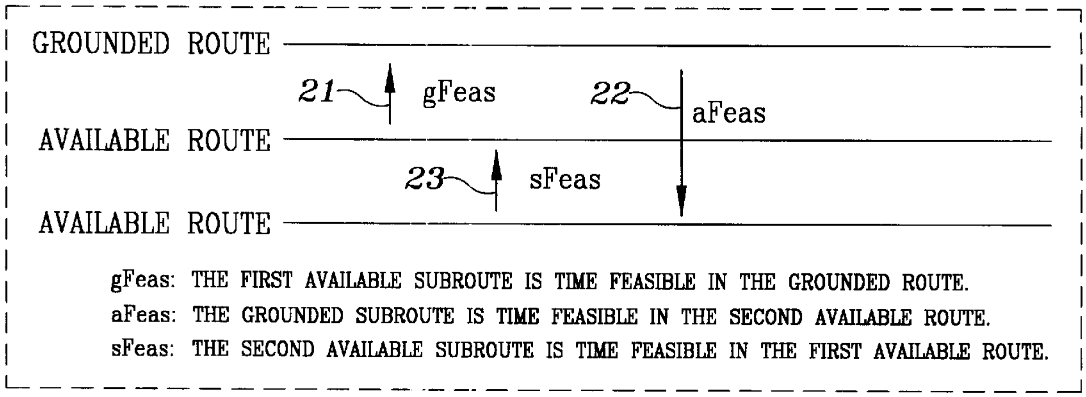
FIG. 2 is a graphical representation of a Three-Way Swap Operation in accordance with the present invention.

Referring to FIG. 2, a Three-Way Swap solution for a Grounded Aircraft Route irregularity is depicted, which identifies the feasibility relationships among the Grounded Aircraft Route and two Available Aircraft Routes in accordance with the invention.

For the solution of FIG. 2 to be acceptable, it is necessary that each flight sequence swap be time and space feasible. That is, a flight sequence to be added that occurs before a flight sequence to be replaced would not be part of an acceptable solution. Further, a flight sequence occurring between two airports in Canada would not be acceptable for swapping with a flight sequence occurring between two airports in the United States.

The feasibility requirements of an acceptable solution for the Grounded Aircraft Route of FIG. 2 may be described as follows:

gFeas: The first Available Subroute is time feasible in the Grounded Aircraft Route.

aFeas: The Grounded Subroute is time feasible in the second Available Route.

sfeas: The second Available Subroute is time feasible in the first Available Aircraft Route.

In order to have a valid Three-Way Swap in conformance with the present invention, gFeas 21, aFeas 22 and sFeas 23 must be true. A Binary Operation will produce an aFeas and a gFeas. These two values will reflect the complete feasibility of that operation, with an outcome of one of the following possibilities:

TABLE I

| | | | | |
|---|---|---|---|---|
| aFeas | 0 | 0 | 1 | 1 |
| gFeas | 0 | 1 | 0 | 1 |

, where 1=Boolean value true

0=Boolean value false

For a Binary Operation to be considered successful, both aFeas and gFeas must represent a Boolean value of true. For a Three-Way Swap Operation in accordance with the present invention, it is not necessary for the outcome of a Binary Operation to produce a Boolean value of true for both aFeas and gFeas. Referring to FIG. 2, it may be observed that for a Grounded Subroute to be placed into the second Available Aircraft Route, only aFeas 22 needs to have a Boolean value of true. Further, for the first Available Subroute to be placed into the Grounded Aircraft Route, only gFeas 21 needs to have a Boolean value of true. The only unknown is that of placing the subroute of the second Available Aircraft Route into the first Available Aircraft Route. The feasibility of this later action is determined through a Three-Way Swap Operation in accordance with the present invention.

The known values of aFeas and gFeas will be used to build tables for Tertiary Operations in accordance with the invention. The method for preprocessing feasibility results from a given Binary Operation, and the method of building such tables now will be disclosed. The method parameters are as follows:

The index of the Available Aircraft (aircraft identification)

The Grounded Aircraft Route

The indices representing a Grounded Subroute's starting and ending positions

The first Available Aircraft Route

The indices representing an Available Subroute's starting and ending positions

The Boolean value of gFeas

The Boolean value of aFeas

The above information is used to build the tables that will represent the state of a Binary Operation. Two tables are used to hold the state information.

A Grounded Feasible Table contains information for each Binary Operation that produces a gFeas of true. That is, the table will hold only those entries that were found to be feasible when swapped into a Grounded Aircraft Route during the Binary Operation.

An Available Feasible Table contains information for each Binary Operation that produces an aFeas of true. This table will hold only the swap entries that were found to be feasible when swapped into an Available Aircraft Route during the Binary Operation.

As Available Aircraft Routes are operated upon by the Binary Operations, the above tables are continually updated until all combinations of Binary Operations have been exercised. A determination then is made whether a Three-Way Swap exists which is feasible. That is, for each member of the Grounded Feasible Table, the Available Feasible Table is searched to find a matching (gH, gT) pair. If such a pair is found, a third route is formed which is comprised of two Available Aircraft Routes.

Since the Grounded Aircraft Route and the Available Aircraft Route pairs are checked for feasibility during the Binary Operations, no additional evaluations except feasibility between Available Aircraft Routes need to take place. That is, if all Binary swap combinations are feasible, then the Three-Way Swap is feasible and may be identified as a feasible solution.

By way of example, three aircraft routes are represented in Table II below, where:

G represents a Grounded Aircraft Route;

A1 represents a first Available Aircraft Route;

A2 represents a second Available Aircraft Route;

Aircraft identifiers or indices are represented by 0,1,2,3, 4,5,6,& 7; and

Airports or Stations are represented by a, b, c, d, g, x, l, m, h, & f.

TABLE II

| | 0 | 1 | 2 | 3 | 4 | 5 | 6 | 7 |
|---|---|---|---|---|---|---|---|---|
| G | a | b | c | a | d | b | a | g |
| A1 | x | l | a | m | b | a | l | h |
| A2 | f | g | h | a | b | a | h | x |

Table III below lists all the feasible Binary Swap Operations that can take place from the above routes of Table II. The Grounded Route Indices are those that describe the actual positions of the two stations being swapped out of the Grounded Aircraft Route. The Available Route Indices are those that describe the actual positions of stations that can be swapped out of the first Available Aircraft Route (A1) or the Second Available Aircraft Route (A2). Referring to the first row of Table II, the station pair (a,b) at start/end positions (0,1) in the Grounded Aircraft Route (G) can be swapped with the first Available Aircraft Route (A1) flight segment occupying start/end positions (2,4), and further can be swapped with the second Available Aircraft Route (A2) flight segment occupying start/end positions (3,4). That is, each of the swaps is both time and space feasible.

TABLE III

| Origin Station | Destination Station | Grounded Route Indices | Available Route Indices A1: First Available Aircraft Route A2: Second Available Aircraft Route | | | |
|---|---|---|---|---|---|---|
| a | b | G(0,1) | A1(2,4) | A2(3,4) | | |
| a | a | G(0,3) | A1(2,5) | A2(3,5) | | |
| a | b | G(0,5) | A1(2,4) | A2(3,4) | | |
| a | a | G(0,6) | A1(2,5) | A2(3,5) | | |
| a | f | G(0,7) | A1(2,7) | A1(5,7) | A2(3,7) | A2(5,7) |
| b | a | G(1,3) | A1(4,5) | A2(4,5) | | |
| b | a | G(1,6) | A1(4,5) | A2(4,5) | | |
| b | f | G(1,7) | A1(4,7) | A2(4,7) | | |
| a | b | G(3,5) | A1(2,4) | A2(3,4) | | |
| a | a | G(3,6) | A1(2,5) | A2(3,5) | | |
| a | f | G(3,7) | A1(2,7) | A1(5,7) | A2(3,7) | A2(5,7) |
| b | a | G(5,6) | A1(4,5) | A2(4,5) | | |
| b | f | G(5,7) | A1(4,7) | A2(4,7) | | |
| A | f | G(6,7) | A1(2,7) | A1(5,7) | A2(3,7) | A2(5,7) |

An anomaly occurs when a swap is performed between a starting position on a Grounded Aircraft Route and ending positions of the Available Aircraft Routes as occurs in row 5 of Table III. Normally, a swap is performed between equivalent stations in both the starting and ending positions, but in this case the ending stations are not equivalent. This type of swap can only take place when the ending position is the last station within the recovery period in both the Grounded Aircraft Route and the Available Aircraft Routes. The index number 7 depicts this condition in Table III.

The record fields of the Grounded Feasible Table IV and the Available Feasible Table V below are defined as follows:

gH: index of the start of the Grounded Subroute gT: index of the end of the Grounded Subroute idx: Available Aircraft identifier aH: index of the start of the Available Subroute aT: index of the end of the Available Subroute Taking from Table III, the Grounded Feasible Table IV contains the following data:

TABLE IV

| gH | gT | idx | aH | aT |
|---|---|---|---|---|
| 0 | 1 | 1 | 2 | 4 |
| 0 | 1 | 2 | 3 | 4 |
| 0 | 3 | 1 | 2 | 5 |
| 0 | 3 | 2 | 3 | 5 |
| 0 | 7 | 1 | 2 | 7 |
| 0 | 7 | 1 | 5 | 7 |
| 0 | 7 | 2 | 3 | 7 |
| 0 | 7 | 2 | 5 | 7 |

Also taking from Table II, the Available Feasible Table V contains the following data:

TABLE V

| gH | gT | idx | aH | aT |
|---|---|---|---|---|
| 0 | 1 | 1 | 2 | 4 |
| 0 | 1 | 2 | 3 | 4 |
| 0 | 3 | 1 | 2 | 5 |
| 0 | 3 | 2 | 3 | 5 |
| 0 | 7 | 1 | 2 | 7 |
| 0 | 7 | 2 | 5 | 7 |

For some Tertiary Operations, the construction of Tables IV and V may differ slightly by the addition of columns to accommodate an aggregate operation. Such an occurrence arises in performing Binary Operations which separate a Grounded Subroute or an Available Subroute into two segments, such as for aggregate Cancel Operations. In this event, a pivot point is introduced that represents the point at which a subroute is split into two subroutes to form a swap or Move portion and a Cancel portion. Such a pivot point may occur in either the Grounded Subroute or the Available Subroute, and is denoted by gP or aP, respectively, when captured in a table. By way of example, Table VI below includes the fields gP and aP:

TABLE VI

| gH | gP | GT | idx | aH | aP | aT |
|---|---|---|---|---|---|---|
| 0 | 3 | 6 | 1 | 2 | −1 | 4 |

In this form, if a field in the table is not needed to store the state for a given Binary Operation, the field may take the value of "−1" to signify that the field is not being used. By making use of each of the forms represented by Tables IV, V, and VI, all states for the Tertiary Operations can be captured and solved.

These tables can be represented programmatically by container classes. A container class is defined as a class defined in terms of an incomplete definition with the incomplete part being an indeterminate type to be defined as a parameter to the class. Two container classes are needed to hold the search criteria for any of the Tertiary Operations. Both container classes are sorted associative containers, which provide the ability for fast retrieval from the collection based on keys. The container classes used are as follows:

Set<Key>: This container class supports unique keys and provides fast retrieval of the keys themselves.

Map<Key,T>: This container class supports unique keys (of type Key) and provides fast retrieval of another type, T, based on the keys.

These container classes are used in the following way:

set<gH, gT, idx, aH, aT>

Key:

gH: index of the start of the Grounded Subroute
gT: index of the end of the Grounded Subroute
idx: Available Aircraft identifier
aH: index of the start of the Available Subroute
aT: index of the end of the Available Subroute map<pair<gH, gT>, set<idx, aH, aT>, less<pair<gH, gT>>>

Key:

gH: index of the start of the Grounded Subroute
gT: index of the end of the Grounded Subroute

T:

idx: Available Aircraft identifier
aH: index of the start of the Available Subroute
aT: index of the end of the Available Subroute By way of example, as in a Three-Way Swap Operation, the set container class will store the information for each Binary Operation that produces a gFeas of true. This set container class will hold only those entries that were found to be feasible when swapped into the Grounded Aircraft Route during the Binary Operation. The key to this set is comprised of the starting and ending points, as a pair of indices, of the available subroute (aH and aT) that were able to swap into the Grounded Aircraft Route (gH and gT), the Available Aircraft index (idx).

As above, by way of example, as in a Three-Way Swap Operation, the map container class will store the information for each Binary Operation that produces an aFeas of true. This map container class will hold only the swap entries that were found to be feasible when swapped into the Available Aircraft Route during the Binary Operation. The key to this map contains the pair of indices that make up the starting and ending points of the Grounded Subroute (gH and gT) that was able to swap into the Available Aircraft Route. The value type of the map is a set comprised of the Available Aircraft index and the Available Subroute indices (aH and aT) that were used in the Binary Operation.

In disclosing the invention herein, a table approach has been used for clarity in grasping the nuances of the various embodiments.

From user requirements and expertise in the field, we have knowledge of the types of Tertiary Operations that will produce the best solutions for given problems. These Tertiary Operations are built from combinations of Binary Operations, from which information is captured and stored in the form of two tables and in terms of the feasibility of placing one subroute into another aircraft route.

There are two main processes that make up Tertiary Operations:

I. The creation of the tables that hold the data from the prior Binary Operations, and that are used in the execution of the Tertiary Operations.

II. The execution of each of the Tertiary Operations, using the data from the two tables created from earlier performed Binary Operations.

The process flow begins by entering Binary Operations performed by U.S. Pat. application Ser. No. 09/364157. All Binary Operations specified in the above application are executed. When the Binary Operations have been performed, the state of each of the operations is captured in a table. These steps are performed in the logic loop from logic step 33 through logic step 41 of FIG. 3, and further clarified in FIGS. 5A and 5B which denote which Binary Operations will cause the generation of which tables used in Tertiary Operations. After all Binary Operations have been performed, all tables needed for Tertiary Operations are created and populated, if the constraints for population have been met.

Figure 3:
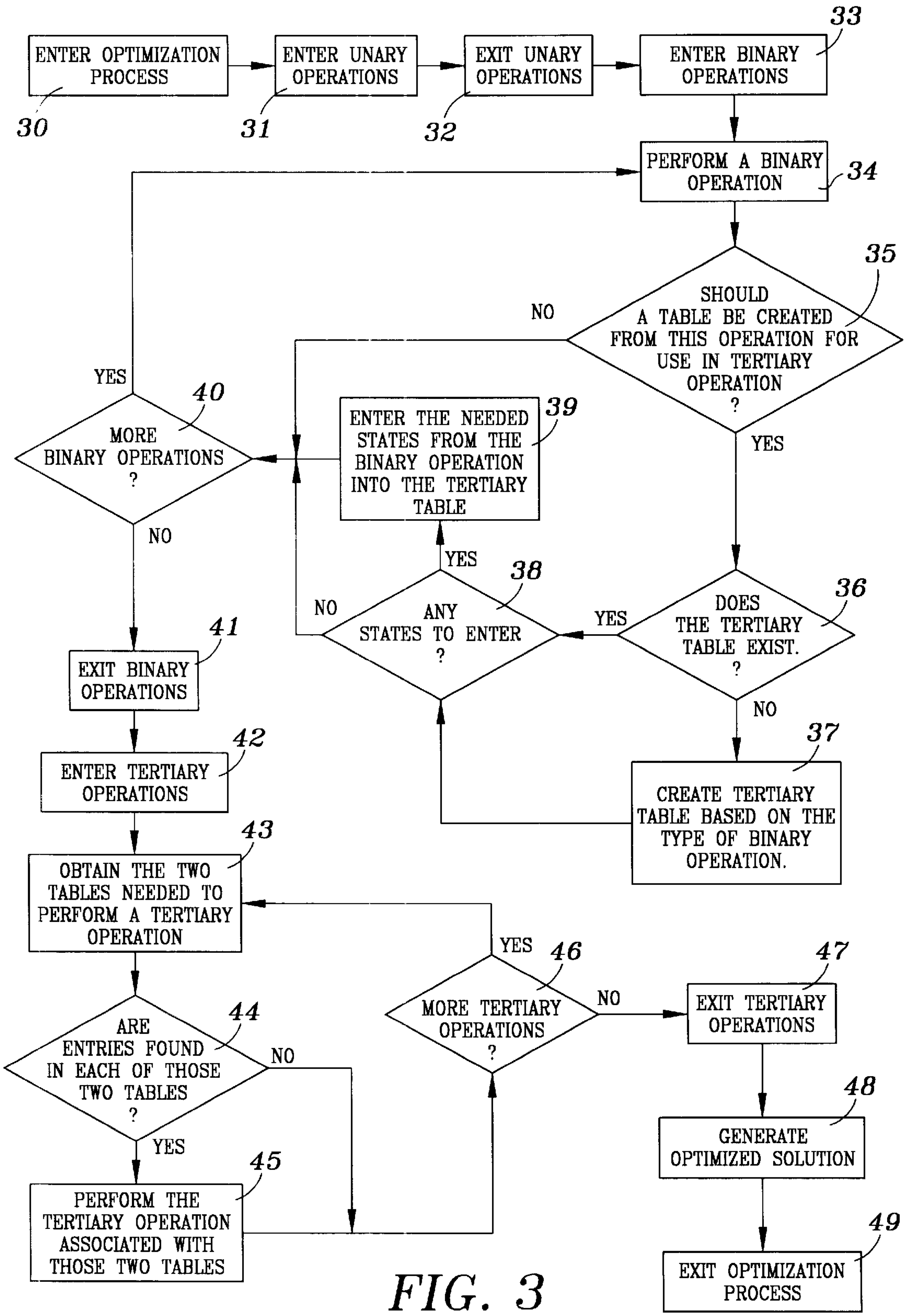
FIG. 3 is an operations logic flow diagram which depicts the relationship of FIGS. 4 through 10B in performing the present invention.
Figure 4:
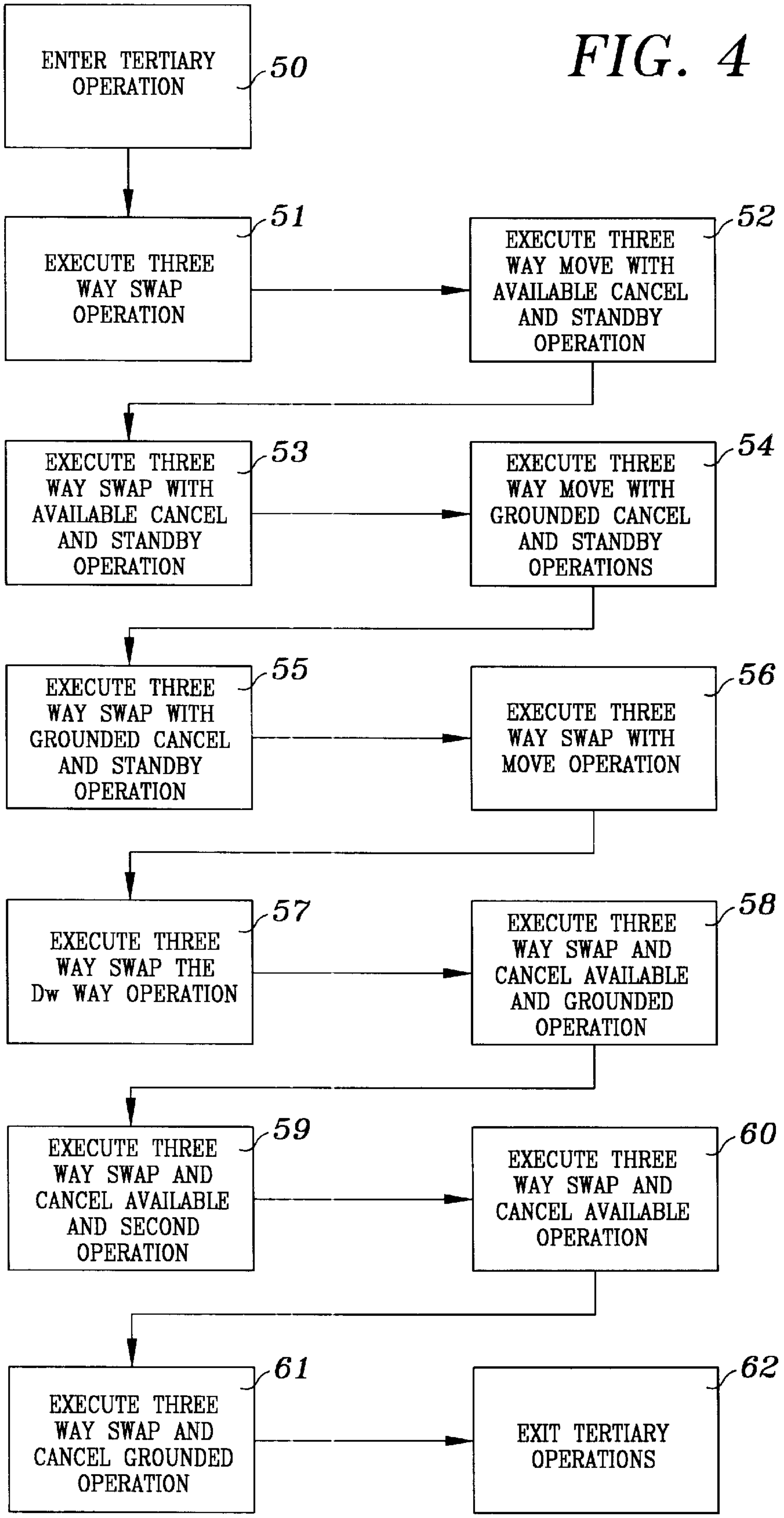
FIG. 4 is a logic flow diagram of the method of the invention in executing a sequence of Tertiary Operations.

The logic steps 42 through 47 of FIG. 3 enter and perform all Tertiary Operations, as further clarified by FIG. 4 which denotes all Tertiary Operations to be performed. Within each Tertiary Operation, the two tables that are associated with that operation are checked. If either table contains no data, then that operation is immediately exited, and the next operation is performed. If both tables are populated, than the logic will be performed to construct a new Grounded Aircraft Route, a new first Available Aircraft Route, and a new second Available Aircraft Route from the data in each of the tables. Once all Tertiary Operations have been executed, the Tertiary Operations are exited.

The two tables that are generated are specific to the Tertiary Operation that will make use of them. Each entry in the tables will capture the positions of the subroutes for both the Grounded Aircraft and an Available Aircraft that were used to perform a prior Binary Operation.

The actual tables generated, and manipulated in accordance with the Tertiary Operation to which they relate, are as follows:

Grounded Feasible Swap Table

Available Feasible Swap Table

Standby Available Feasible Move And Cancel Table

Grounded Feasible Move Table

Standby Available Feasible Table

Standby Grounded Feasible Move And Cancel Table

Standby Grounded Feasible Table

Swap And Cancel Available And Grounded Feasible Table

Swap And Cancel Available And Second Feasible Table

Swap And Cancel Available Feasible Table

Swap And Cancel Grounded Feasible Table

Once the two tables are formed, one entry from one table is compared against one entry from another table in such a way as to search for correlation within the Grounded Subroutes that are captured. From such correlation, a Grounded Subroute and two Available Subroutes can be manipulated to build the Tertiary Operation. The building of three new aircraft routes as a alternative optimum solution is governed by the type of Tertiary Operation that is performed.

Each of the Tertiary Operations which are performed in accordance with the invention are described below, beginning with a Three-Way Swap Operation. In each description, the tables to be generated are identified, and are built in accordance with the guidelines given in connection with the description of FIGS. 5A and 5B.

A Three-Way Swap Operation in accordance with the invention is comprised of the removal of a sequence of flights from a Grounded Aircraft Route as indicated by gH and gT in a Grounded Feasible Swap Table; the removal of a sequence of flights from an Available Aircraft Route pointed to by the idx field in the Grounded Feasible Swap Table and indicated by aH and aT in the Grounded Feasible Swap Table; and the removal of a sequence of flights from an Available Aircraft Route pointed to by the idx field of the Available Feasible Swap Table and indicated by aH and aT. Thereafter, the sequence of flights making up the Grounded Aircraft Subroute and defined by gH and gT in the Grounded Feasible Swap Table are replaced by the sequence of flights making up the Available Aircraft Subroute that are pointed to by the idx field in the Grounded Feasible Swap Table defined by aH and aT. Further, the sequence of flights making up the Available Aircraft Subroute that is pointed to by the idx field in the Grounded Feasible Swap Table and defined by aH and aT, is replaced with the sequence of flights making up the Available Aircraft Subroute that are pointed to by the idx field in the Available Feasible Swap Table and defined by aH and aT. Lastly, the sequence of flights making up the Available Aircraft Subroute pointed to by idx in the Available Feasible Swap Table and defined by aH and aT, is replaced with the sequence of flights making up the Grounded Aircraft Subroute in the Grounded Feasible Swap Table that is defined by gH and gT.

A Three-Way Move With Available Cancel And Standby Operation is comprised of the removal of a sequence of flights from a Grounded Aircraft Route defined by gH and gT in the Standby Available Feasible Move And Cancel Table, the removal of a sequence of flights from an Available Aircraft Route pointed to by the idx field in the Standby Available Feasible Move And Cancel Table and defined by aH and aT, and the identification of an insertion point in the Available Aircraft Route pointed to by the idx field in the Grounded Feasible Move Table. Then, the sequence of flights making up the Available Aircraft Subroute that is pointed to by the idx field in the the Standby Available Feasible Move And Cancel Table and defined by aH and aT is replaced by the sequence of flights making up the Grounded Aircraft Subroute and defined by gH and gT in the Standby Available Feasible Move And Cancel Table. Lastly, the sequence of flights making up the Available Aircraft Subroute pointed to by the idx field in the Standby Available Feasible Move And Cancel Table and defined by aH and aT is inserted before the sequence of flights making up the Available Aircraft Subroute pointed to by the idx field in the Grounded Feasible Move Table and defined by aH and aT.

A Three-Way Swap With Available Cancel And Standby Operation is comprised of the removal of a sequence of flights from a Grounded Aircraft Route defined by gHl and gT in the Standby Available Feasible Table, the removal of a sequence of flights from an Available Aircraft Route pointed to by the idx field in the Standby Available Feasible Table and defined by aH, aP and aT, and the identification of an insertion point in the Available Aircraft Route pointed to by the idx field in the Grounded Feasible Move Table, and defined by aH and aT. Then, the sequence of flights making up the Available Aircraft Subroute pointed to by the idx field in the Standby Available Feasible Table and defined by aH and aT, is replaced with the sequence of flights making up the Grounded Aircraft Subroute defined by gH and gT in the Standby Available Feasible Table. Next, the sequence of flights making up the Grounded Aircraft Subroute defined by gH and gT in the Standby Available Feasible Table is replaced with the sequence of flights making up a portion of the Available Aircraft Subroute pointed to by the idx field in the Standby Available Feasible Table and defined by aP and aT. Lastly, the sequence of flights making up the remaining portion of the Available Aircraft Subroute pointed to by the idx field in the Standby Available Feasible Table and defined by aH and aP is inserted before the sequence of flights making up the Available Aircraft Subroute pointed to by the idx field in the Grounded Feasible Move Table defined by aH and aT.

A Three-Way Move With Grounded Cancel And Standby Operation is comprised of the removal of a sequence of flights from a Grounded Aircraft Route defined by gH, gP and gT in a Standby Grounded Feasible Move And Cancel Table, the identification of an insertion point in an Available Aircraft Route pointed to by the idx field in a Standby Grounded Feasible Move And Cancel Table, and defined by aH and aT, and the identification of an insertion point in an Available Aircraft Route pointed to by the idx field in a Grounded Feasible Move Table defined by aH and aT. Thereafter, the sequence of flights making up a portion of the Grounded Aircraft Subroute defined by gP and gT, is inserted before the sequence of flights making up the Available Aircraft Subroute pointed to by the idx field in the Standby Grounded Feasible Move And Cancel Table defined by aH and aT. Lastly, the sequence of flights making up the last portion of the Grounded Aircraft Subroute defined by gH and gP, is inserted before the sequence of flights making up the Available Aircraft Subroute pointed to by the idx field in the Grounded Feasible Move Table and defined by aH and aT.

A Three-Way Swap With Grounded Cancel And Standby Operation is comprised of the removal of a sequence of flights from a Grounded Aircraft Route defined by gH, gP and gT in a Standby Grounded Feasible Table, the removal of a sequence of flights from an Available Aircraft Route pointed to by the idx field in the Standby Grounded Feasible Table defined by aH and aT, and the identification of an insertion point in the Available Aircraft Route pointed to by the idx field in the Grounded Feasible Move Table defined by aH and aT. The sequence of flights making up the Available Aircraft Subroute pointed to by the idx field in the Standby Grounded Feasible Table and defined by aH and aT, is replaced by the sequence of flights making up a portion of the Grounded Aircraft Subroute defined by gP and gT in the Standby Grounded Feasible Table. The sequence of flights making the Grounded Aircraft Subroute defined by gH and gT in the Standby Grounded Feasible Table is replaced by the sequence of flights making up a portion of the Available Aircraft Subroute pointed to by the idx field in the Standby Grounded Feasible Table and defined by aH and aT. Lastly, the sequence of flights making up the last portion of the Grounded Aircraft Subroute defined by gH and gP is inserted before the sequence of flights in the Available Aircraft Subroute pointed to by the idx field in the Grounded Feasible Move Table and defined by aH and aT.

A Three-Way Swap With Move Operation is comprised of the removal of a first sequence of flights from a Grounded Aircraft Route defined by gH and gT in the Grounded Feasible Move Table, the identification of an insertion point in a sequence of flights from an Available Aircraft Route pointed to by the idx field in the Grounded Feasible Move Table and defined by aH and aT, and the removal of a sequence of flights from an Available Aircraft Route pointed to by the idx field in the Available Feasible Swap Table and defined by aH and aT . The sequence of flights making up the Available Aircraft Subroute pointed to by the idx field in the Available Feasible Swap Table and defined by aH and aT, is inserted before the sequence of flights in an Available Aircraft Subroute pointed to by the idx field in the Grounded Feasible Move Table and defined by aH and aT. Lastly, the sequence of flights making up the Available Aircraft Subroute pointed to by the idx field in the Available Feasible Swap Table and defined by aH and aT, is replaced by the sequence of flights making up the Grounded Aircraft Subroute defined by gH and gT in the Grounded Feasible Move Table.

A Three-Way Swap The Dw Way Operation is comprised of the removal of a sequence of flights from a Grounded Aircraft Route defined by gH and gT in a Grounded Feasible Swap Table, the removal of a sequence of flights from an Available Aircraft Route pointed to by the idx field in a Grounded Feasible Swap Table and defined by aH and aT in the Grounded Feasible Swap Table, and the removal of a sequence of flights from an Available Aircraft Route pointed to by the idx field of an Available Feasible Swap Table and defined by aH and aT. The sequence of flights making up the Grounded Aircraft Subroute defined by gH and gT in the Grounded Feasible Swap Table is replaced by the sequence of flights making up the Available Aircraft Subroute pointed to by the idx field in the Grounded Feasible Swap Table and defined by aH and aT. Next, the sequence of flights making up the Available Aircraft Subroute pointed to by the idx field in the Grounded Feasible Swap Table and defined by aH and aT, is replaced by a sequence of flights making up a portion of the Grounded Aircraft Subroute and defined by gH and a flight index less than that of gT in the Grounded Feasible Swap Table. This is accomplished by iterating through the indices of the Grounded Aircraft Subroute, starting from gH and ending before gT, and leaving at least one portion from that point to the end, gT, to swap.

A swapped Grounded Aircraft Subroute portion is defined by both the starting and ending indices containing the identical airport. Lastly, the sequence of flights making up the Available Aircraft Subroute pointed to by the idx field in the Available Feasible Swap Table and defined by aH and aT, is replaced by the sequence of flights making up the last portion of the Grounded Aircraft Subroute defined by what is left from the end of the first portion until that of gT in the Grounded Feasible Swap Table.

A Three-Way Swap And Cancel Available And Grounded Operation is comprised of the removal of a sequence of flights from a Grounded Aircraft Route defined by gH, gP and gT in a Swap And Cancel Available And Grounded Feasible Table, the removal of a sequence of flights from the Available Aircraft Route pointed to by the idx field in the Swap And Cancel Available And Grounded Feasible Table and defined by aH, aP and aT, and the removal of a sequence of flights from the Available Aircraft Route pointed to by the idx field of the Available Feasible Swap Table and defined by aH and aT. Then, the sequence of flights making up the Grounded Aircraft Subroute defined by gH and gT in the Swap And Cancel Available And Grounded Feasible Table is replaced with the sequence of flights making up a portion of the Available Aircraft Subroute pointed to by the idx field in the Swap And Cancel Available And Grounded Feasible Table and defined by aP and aT. Thereafter, a Phantom Route is generated with the sequence of flights making up a next portion of the Available Aircraft Subroute pointed to by the idx field in the Swap And Cancel Available And Grounded Feasible Table and defined by aH and aP. Next, the sequence of flights making up the Available Aircraft Subroute pointed to by the idx field in the Swap And Cancel Available And Grounded Feasible Table and defined by aH and aT, is replaced with the sequence of flights making up the Available Aircraft Subroute pointed to by the idx field in the Available Feasible Swap Table and defined by aH and aT. The sequence of flights making up the Available Aircraft Subroute pointed to by the idx field in the Available Feasible Swap Table and defined by aH and aT, then is replaced with the sequence of flights making up the first portion of the Grounded Aircraft Subroute defined by gP and gT in the Swap And Cancel Available And Grounded Feasible Table. A second Phantom Route then is generated with the sequence of flights making up the next portion of the Grounded Aircraft Subroute defined by gH and gP in the Swap And Cancel Available And Grounded Feasible Table.

A Three-Way Swap And Cancel Available And Second Operation is comprised of the removal of a sequence of flights from a Grounded Aircraft Route defined by gH and gT in the Swap And Cancel Available And Second Feasible Table, the removal of a sequence of flights from the Available Aircraft Route pointed to by the idx field in the Swap And Cancel Available And Second Feasible Table and defined by aH, aP and aT, and the removal of a sequence of flights from the Available Aircraft Route pointed to by the idx field of the Swap And Cancel Available Feasible Swap Table and defined by aH, aP and aT. Then, the sequence of flights making up the Grounded Aircraft Subroute defined by gH and gT in the Swap And Cancel Available And Second Feasible Table, is replaced by the sequence of flights making up a portion of the Available Aircraft Subroute pointed to by the idx field in the Swap And Cancel Available And Second Feasible Table and defined by aP and aT. A Phantom Route next is generated with the sequence of flights making up a next portion of the Available Aircraft Subroute pointed to by the idx field in the Swap And Cancel Available And Second Feasible Table and defined by aH and aP. The sequence of flights making up the Available Aircraft Subroute pointed to by the idx field in the Swap And Cancel Available And Second Feasible Table and defined by aH and aT, is replaced by the sequence of flights making up a portion of the Available Aircraft Subroute pointed to by the idx field in the Swap And Cancel Available Feasible Swap Table and defined by aP and aT. A second Phantom Route is generated with the sequence of flights making up the next portion of the Available Aircraft Subroute pointed to by the idx field in the Swap And Cancel Available Feasible Table defined by aH and aP. Lastly, the sequence of flights making up the Available Aircraft Subroute pointed to by the idx field in the Swap And Cancel Available Feasible Table and defined by aH and aT, is replaced by the sequence of flights making up the Grounded Aircraft Subroute pointed to by gH and gT in the Swap And Cancel Available And Second Feasible Table.

A Three-Way Swap And Cancel Available Operation is comprised of the removal of a first sequence of flights from a Grounded Aircraft Route defined by gH and gT in the Swap And Cancel Available Feasible Table, the removal of a sequence of flights from an Available Aircraft Route pointed to by the idx field in the Swap And Cancel Available Feasible Table and defined by aH, aP and aT, and the removal of a sequence of flights from an Available Aircraft Route pointed to by the idx field of an Available Feasible Swap Table and defined by aH and aT. Then, a sequence of flights making up the Grounded Aircraft Subroute defined by gH and gT in a Swap And Cancel Available Feasible Table, is replaced by a sequence of flights making up a first portion of an Available Aircraft Subroute pointed to by the idx field in the Swap And Cancel Available Feasible Table and defined by aH and aP. A Phantom Route is generated with a sequence of flights making up a next portion of an Available Aircraft Subroute defined by aP and aT in the Swap And Cancel Available Feasible Table. Next, the sequence of flights making up the Available Aircraft Subroute pointed to by the idx field in the Swap And Cancel Available Feasible Table and defined by aH and aT, is replaced by the sequence of flights making up an Available Aircraft Subroute pointed to by the idx field in an Available Feasible Swap Table and defined by aH and aT. Lastly, the sequence of flights making up the Available Aircraft Subroute pointed to by the idx field in the Available Feasible Swap Table and defined by aH and aT, is replaced by the sequence of flights making up the Grounded Aircraft Subroute and defined by gH and gT in the Swap And Cancel Available Feasible Table.

A Three-Way Swap And Cancel Grounded Operation is comprised of the removal of a sequence of flights from a Grounded Aircraft Route defined by gH, gP and gT in a Swap And Cancel Grounded Feasible Table, the removal of a sequence of flights from an Available Aircraft Route pointed to by the idx field in the Swap And Cancel Grounded Feasible Table and defined by aH and aT, and the removal of a sequence of flights from an Available Aircraft Route pointed to by the idx field of the Available Feasible Swap Table and defined by aH and aT. Then, the sequence of flights making up the Grounded Aircraft Subroute defined by gH and gT in the Swap And Cancel Grounded Feasible Table, is replaced by the sequence of flights making up the Available Aircraft Subroute pointed to by the idx field in the Swap And Cancel Grounded Feasible Table and defined by aH and aT. Next, the sequence of flights making up the Available Aircraft Subroute pointed to by the idx field in the Swap And Cancel Grounded Feasible Table and defined by aH and aT, is replaced by the sequence of flights making up the Available Aircraft Subroute pointed to by the idx field in the Available Feasible Swap Table and defined by aH and aT. The sequence of flights making up the Available Aircraft Subroute pointed to by the idx field in the Available Feasible Swap Table and defined by aH and aT, is replaced by the sequence of flights making up the first portion of the Grounded Aircraft Subroute defined by gP and gT in the Swap And Cancel Grounded Feasible Table. A Phantom Route thereafter is generated with the sequence of flights making up the next portion of the Grounded Aircraft Subroute defined by gH and gP in the Swap And Cancel Grounded Feasible Table.

Referring to FIG. 3, an overview of the operations performed in a Tertiary Operation is illustrated. The process to be performed by the Aircraft Optimization Engine 3 of FIG. 1 is entered at logic step 30, and the logic flow process thereafter proceeds to logic step 31 to perform Unary Operations. From logic step 31, the logic flow process continues to logic step 32 to exit the Unary Operations and thereafter proceeds to logic step 33 to perform the Binary Operations.

The logic flow process then moves from logic step 33 to logic step 34 to perform any Binary Operations specified in logic step 33, and then proceeds to logic step 35 to determine whether the Binary Operation performed at logic step 34 is one that produces an aFeas,gFeas combination or state that would allow a record entry in a Tertiary Operation table. If so, the logic flow process moves to logic step 36 to determine whether a previous Tertiary Operation table has been generated. If a Tertiary Operation table has not previously been generated, the logic flow process jumps to logic step 37 to generate Tertiary Operation tables, and then continues to logic step 38 to determine whether any gFeas,aFeas combinations or states exist from the preceding logic steps that would allow data to be entered into the Tertiary Operation tables generated at logic step 37.

If previously generated Tertiary Operation tables are found at logic step 36, the logic flow process moves directly from logic step 36 to logic step 38 to continue as before described. Further, if states to be entered into the Tertiary Operation tables are found to exist at logic step 38, the logic flow process moves to logic step 39 to enter the states into the Tertiary Operation tables. From logic step 39, the logic flow process moves to logic step 40 to determine whether any additional Binary Operations have occurred. The logic flow process also enters logic step 40 from logic step 35 if it is determined that no Tertiary Operation table should be created, or from logic state 38 if no states are found for entering into the Tertiary Operation tables.

If additional Binary Operations are found to have occurred at logic step 40, the logic flow process returns to logic step 34 to continue as before described. If no further Binary Operations are identified at logic step 40, however, the logic flow process continues to logic step 41 to exit the Binary Operations. From logic step 41, the logic flow process proceeds to logic step 42 to enter the Tertiary Operations, and thereafter continues to logic step 43 to generate Tables IV and V as described above. From logic step 43, the logic flow process continues to logic step 44 to determine whether any entries are found in Tables IV and V. If yes, the Tertiary Operation associated with Tables IV and V is performed at logic step 45. If no entries are found in Tables IV and V at logic step 44, or upon the Tertiary Operation of logic step 45 being performed, the logic flow process proceeds to logic step 46 to determine whether any additional Tertiary Operations are to be performed. If so, the logic flow process moves from logic step 46 to logic step 43 to continue as before described. If not, the logic flow process proceeds from logic step 46 to logic step 47 to exit the Tertiary Operations.

From logic step 47, the logic flow process continues to logic step 48 to generate alternative optimum solutions as described in U.S. patent application Ser. No. 09/364,157. From logic step 48, the logic flow process continues to logic step 49 to exit the optimization process.

Referrng to FIG. 4, the logic steps to be performed by the Aircraft Optimization Engine 3 of FIG. 1 in executing the Tertiary Operations of the present invention are illustrated. Prior to logic step 50 of FIG. 4, Binary Operations have been performed on all Grounded Aircraft Routes and Available Aircraft Routes. Thereafter, the logic flow process enters Tertiary Operations at logic step 50, and proceeds to logic step 51 to execute a Three-Way Swap Operation in accordance with the invention. From logic step 51 the logic flow process continues to logic step 52 where a Three Way Move With Available Cancel And Standby Operation is executed. The logic flow process then proceeds to logic step 53 where a Three Way Swap With Available Cancel And Standby Operation is executed. After logic step 53, the logic flow process continues to logic step 54 to execute a Three Way Move With Grounded Cancel And Standby Operation. Thereafter, the logic flow process executes a Three Way Swap With Grounded Cancel And Standby Operation at logic step 55, and proceeds to logic step 56 to execute a Three Way Swap With Move Operation.

From logic step 56, the logic flow process continues to logic step 57 where a Three Way Swap The Dw Way Operation is executed. The logic flow process then proceeds to logic step 58 to execute a Three Way Swap And Cancel Available And Grounded Operation, and thereafter to logic step 59 to execute a Three Way Swap And Cancel Available And Second Operation. After logic step 59, the logic flow process proceeds to logic step 60 to execute a Three Way Swap And Cancel Available Operation. Thereafter at logic step 6 1, the logic flow process executes a Three Way Swap And Cancel Grounded Operation. From logic step 61, the logic flow process moves to logic step 62 to exit the Tertiary Operations.

It is to be understood that logic steps 51 through 58 operate on data supplied by the previously described Tables III, IV, and V above, as well as permutations of those tables as depleted by Table VI. If no data entries relating to a particular Tertiary Operation are found in the tables, that Tertiary Operation is simply by passed.

Figure 5A:
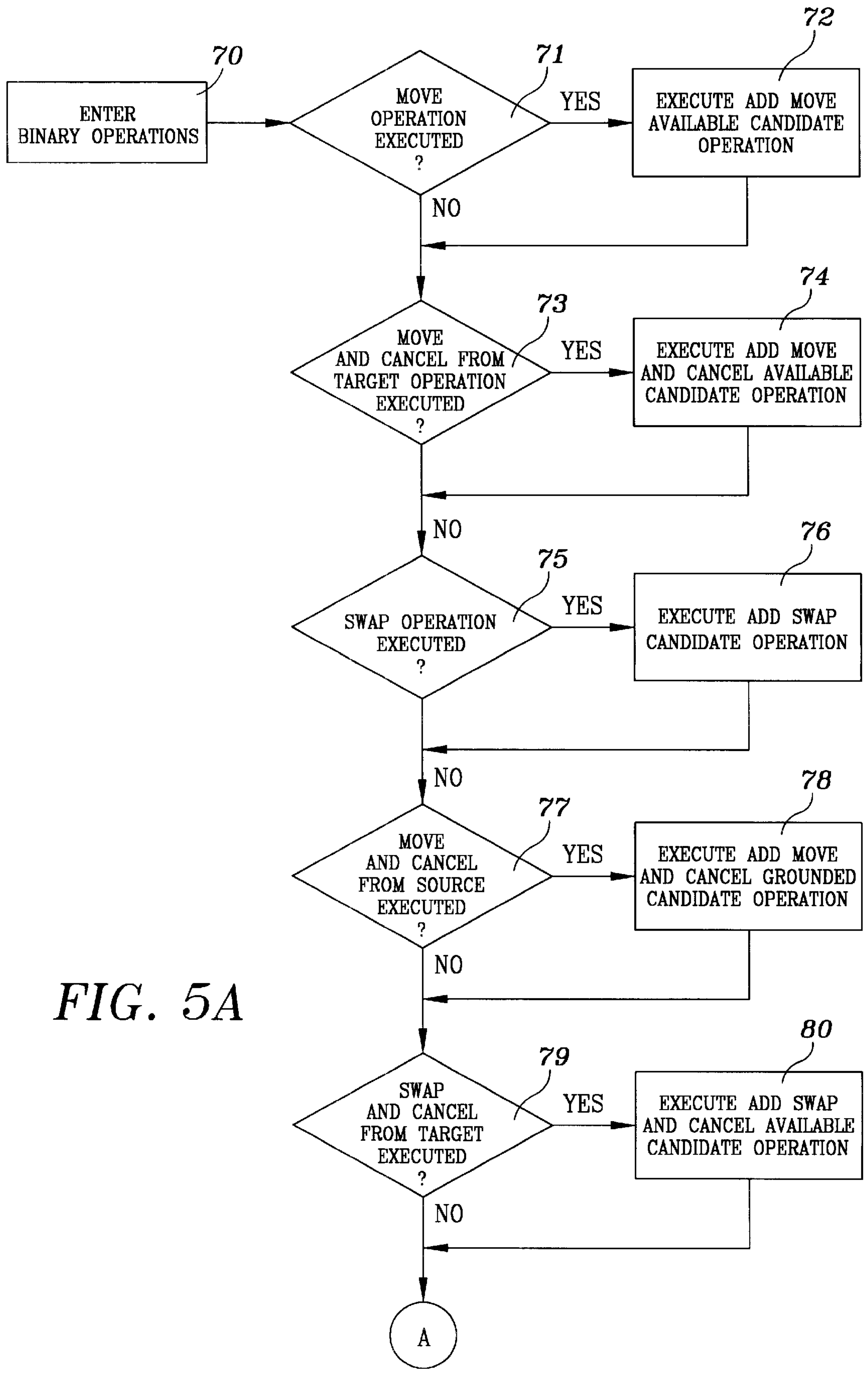
FIGS. 5A and 5B are logic flow diagrams of the invention in executing an ADD Candidate Operation.
Figure 5B:
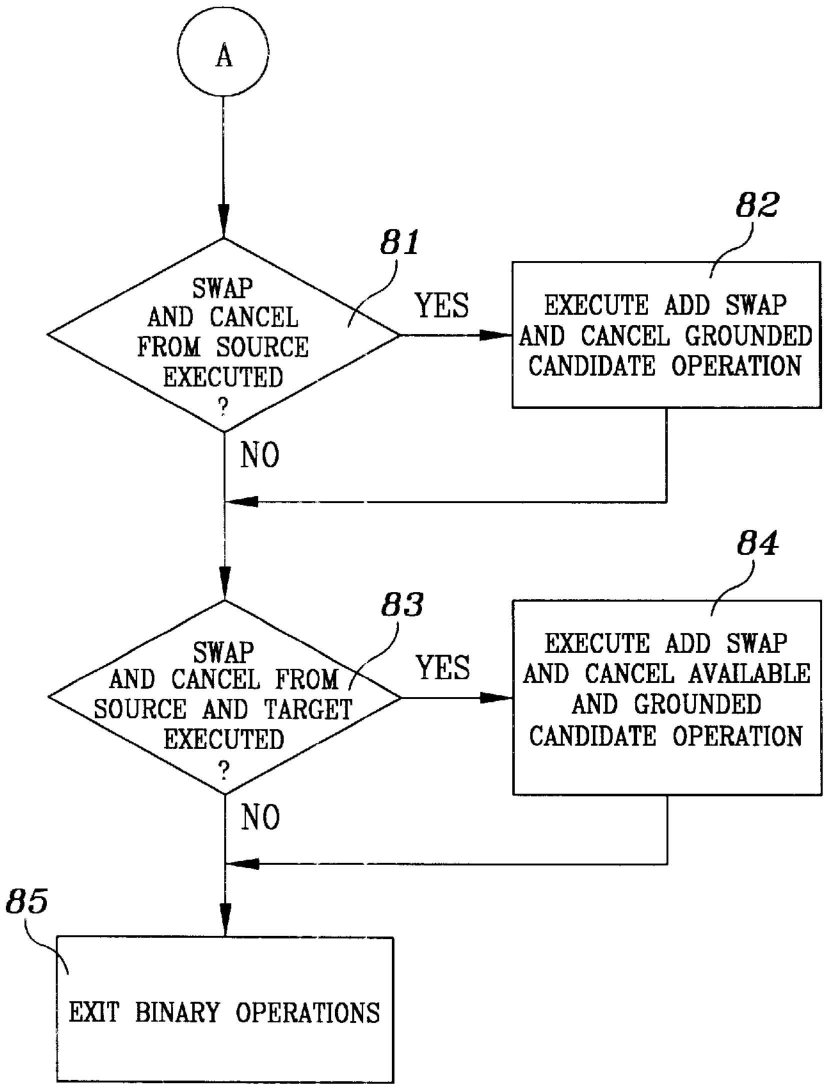

Referring to FIGS. 5A and 5B, the logic steps performed by the Aircraft Optimization Engine 3 of FIG. 1 to determine which of the tables to build for the execution of a Tertiary Operation is illustrated. At logic step 70, the Binary Operations are entered. At logic step 71 a decision is made whether a Move Operation has been executed. If so, the logic flow process moves to logic step 72 to execute an Add Move Available Candidate Operation.

If both gFeas and aFeas hold Boolean values of true, the following fields are created and added to a row in the Grounded Feasible Move Table: the index representing the first flight in the Grounded Subroute is placed into gH; the index representing the last flight in the Grounded Subroute is placed into gT; the value "−1" is placed into gP; the index representing the first flight in the Available Subroute is placed into both aH and aT; the value "−1" is placed into aP; and the index representing the aircraft is placed into idx.

From logic step 72 the logic flow process continues to logic step 73. Further, if no prior Move Operation has been executed as determined at logic step 71, the logic flow process proceeds from logic step 71 to logic step 73. At logic step 73, a determination is made whether a Move And Cancel From Target Operation has been executed. If so, the logic flow process moves to logic step 74 to execute an Add Move And Cancel Available Candidate Operation before proceeding to logic step 75. If at logic step 74 both gFeas and aFeas hold Boolean values of true, the following fields are created and added to a row in the Standby Available Feasible Move And Cancel Table: the index representing the first flight in the Grounded Subroute is placed into gH; the index representing the last flight in the Grounded Subroute is placed into gT; the value "−1" is placed into gP; the index representing the first flight in the Available Subroute is placed into aH; the index representing the last flight in the Available Subroute is placed into aT; the value "−1" is placed into gP; and the index representing the aircraft is placed into idx.

If the determination at logic step 73 is negative, the logic flow process proceeds directly from logic step 73 to logic step 75 to determine whether a Swap Operation has been executed. If yes, the logic flow process moves to logic step 76 to execute an Add Swap Candidate Operation. If at logic step 76 aFeas holds a Boolean value of true, the following fields are created and added to a row in the Available Feasible Swap Table: the index representing the first flight in the Grounded Subroute is placed into gH; the index representing the last flight in the Grounded Subroute is placed into gT; the value "−1" is placed into gP; the index representing the first flight in the Available Subroute is placed into aH; the index representing the last flight in the Available Subroute is placed into aT; the value "−1" is placed into gP; and the index representing the aircraft is placed into idx. If at logic step 76 gFeas holds a Boolean value of true, the following fields are created and added to a row in the Grounded Feasible Swap Table: the index representing the first flight in the Grounded Subroute is placed into gH; the index representing the last flight in the Grounded Subroute is placed into gT; the value "−1" is placed into gP; the index representing the first flight in the Available Subroute is placed into aH; the index representing the last flight in the Available Subroute is placed into aT; the value "−1" is placed into gP; and the index representing the aircraft is placed into idx.

From logic step 76, the logic flow process proceeds to logic step 77. If the determination at logic step 75 is negative, however, the logic flow process proceeds directly from logic step 75 to logic step 77. At logic step 77, a determination is made whether a Move And Cancel From Source Operation has been executed. If yes, the logic flow process proceeds to logic step 78 to execute an Add Move And Cancel Grounded Candidate Operation. If at logic step 78 both gFeas and aFeas hold Boolean values of true, the following fields are created and added to a row in the Standby Grounded Feasible Move And Cancel Table: the index representing the first flight in the Grounded Subroute is placed into gH; the index representing the last flight in the Grounded Subroute is placed into gT; the index representing the middle flight in the Grounded Subroute is placed into gP; the index representing the first flight in the Available Subroute is placed into both aH and aT; the value "−1" is placed into aP; and the index representing the aircraft is placed into idx.

The logic flow process thereafter continues from logic step 78 to logic step 79. If the decision at logic step 77 is negative, the logic flow process proceeds directly from logic step 77 to logic step 79. At logic step 79, a determination is made whether a Swap And Cancel From Target Operation has been executed. If yes, the logic flow process moves to logic step 80 to execute an Add Swap And Cancel Available Candidate Operation. If at logic step 80 gFeas holds a Boolean value of true, create and add the following fields to a row in the Swap And Cancel Available Feasible Swap Table: the index representing the first flight in the Grounded Subroute is placed into gH; the index representing the last flight in the Grounded Subroute is placed into gT; the value "−1" is placed into gP; the index representing the first flight in the Available Subroute is placed into aH; the index representing the last flight in the Available Subroute is placed into aT; the index representing the middle flight in the Available Subroute is placed into aP; and the index representing the aircraft is placed into idx.

If at logic step 80 gFeas and aFeas both hold a Boolean value of true, the following fields are created and added to a row in the Standby Available Feasible Table: the index representing the first flight in the Grounded Subroute is placed into gH; the index representing the last flight in the Grounded Subroute is placed into gT; the value "−1" is placed into gP; the index representing the first flight in the Available Subroute is placed into aH; the index representing the last flight in the Available Subroute is placed into aT; the index representing the middle flight in the Available Subroute is placed into aP; and the index representing the aircraft is placed into idx.

If at logic step 80 gFeas and aFeas both hold a Boolean value of true, the following fields are created and added to a row in the Swap And Cancel Available And Second Feasible Table: the index representing the first flight in the Grounded Subroute is placed into gH; the index representing the last flight in the Grounded Subroute is placed into gT; the value "−1" is placed into gP; the index representing the first flight in the Available Subroute is placed into aH; the index representing the last flight in the Available Subroute is placed into aT; the index representing the middle flight in the Available Subroute is placed into aP; and the index representing the aircraft is placed into idx.

From logic step 80, the logic flow process moves through node A to logic step 81. If the decision at logic step 79 is negative, however, the logic flow process proceeds directly from logic step 79 and through node A to logic step 81. At logic step 81, a determination is made whether a Swap And Cancel From Source Operation has been executed. If yes, the logic flow process moves to logic step 82 to execute an Add Swap And Cancel Grounded Candidate Operation. If at logic step 82 gFeas holds a Boolean value of true, the following fields are created and added to a row in the Swap And Cancel Grounded Feasible Table: the index representing the first flight in the Grounded Subroute is placed into gH; the index representing the last flight in the Grounded Subroute is placed into gT; the index representing the middle flight in the Grounded Subroute is placed into gP; the index representing the first flight in the Available Subroute is placed into aH; the index representing the last flight in the Available Subroute is placed into aT; the value "−1" is placed into aP; and the index representing the aircraft is placed into idx.

If at logic step 82 gFeas and aFeas both hold a Boolean value of true, the following fields are created and added to a row in the Standby Grounded Feasible Table: the index representing the first flight in the Grounded Subroute is placed into gH; the index representing the last flight in the Grounded Subroute is placed into gT; the index representing the middle flight in the Grounded Subroute is placed into gP; the index representing the first flight in the Available Subroute is placed into aH; the index representing the last flight in the Available Subroute is placed into aT; the value "−1 " is placed into aP; and the index representing the aircraft is placed into idx.

The logic flow process continues from logic step 82 to logic step 83. If the determination at logic step 81 is negative, however, the logic flow process proceeds directly from logic step 81 to logic step 83, where a determination is made whether a Swap And Cancel From Source And Target Operation has been executed. If yes, the logic flow process moves to logic step 84 to execute an Add Swap And Cancel Available And Grounded Candidate Operation. If at logic step 84 gFeas holds a Boolean value of true, the following fields are created and added to a row in the Swap And Cancel Available And Grounded Feasible Table: the index representing the first flight in the Grounded Subroute is placed into gH; the index representing the last flight in the Grounded Subroute is placed into gT; the index representing the middle flight in the Grounded Subroute is placed into gP; the index representing the first flight in the Available Subroute is placed into aH; the index representing the last flight in the Available Subroute is placed into aT; the index representing the middle flight in the Available Subroute is placed into aP; and the index representing the aircraft is placed into idx.

The logic flow process thereafter proceeds from logic step 84 to logic step 85, where the process exits Binary Operations. If the determination at logic step 83 is negative, however, the logic flow process proceeds directly to logic step 85, where the process exits Binary Operations.

Figure 6A:
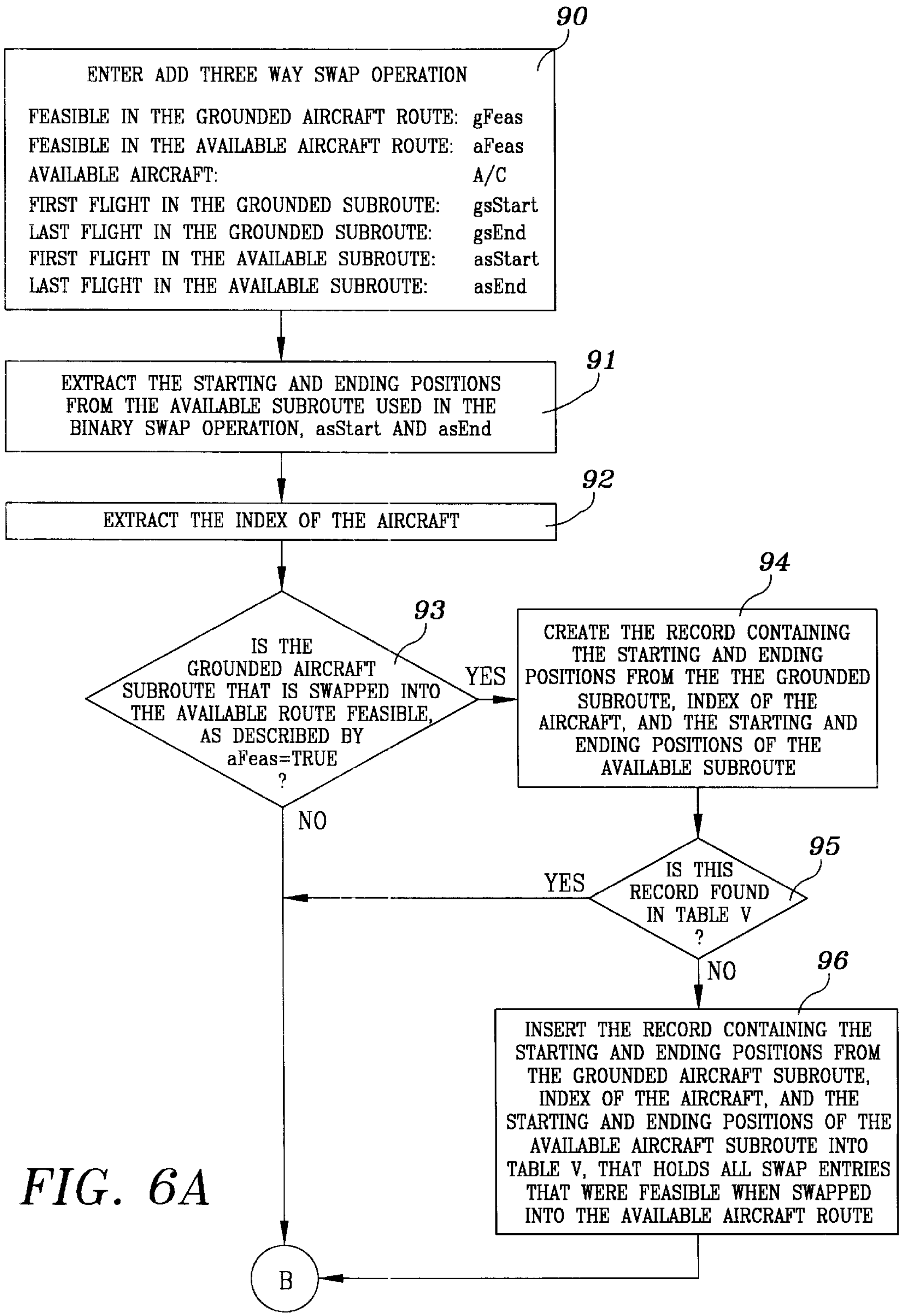
FIGS. 6A and 6B are logic flow diagrams of the invention in executing an Add Swap Candidate Operation.
Figure 6B:
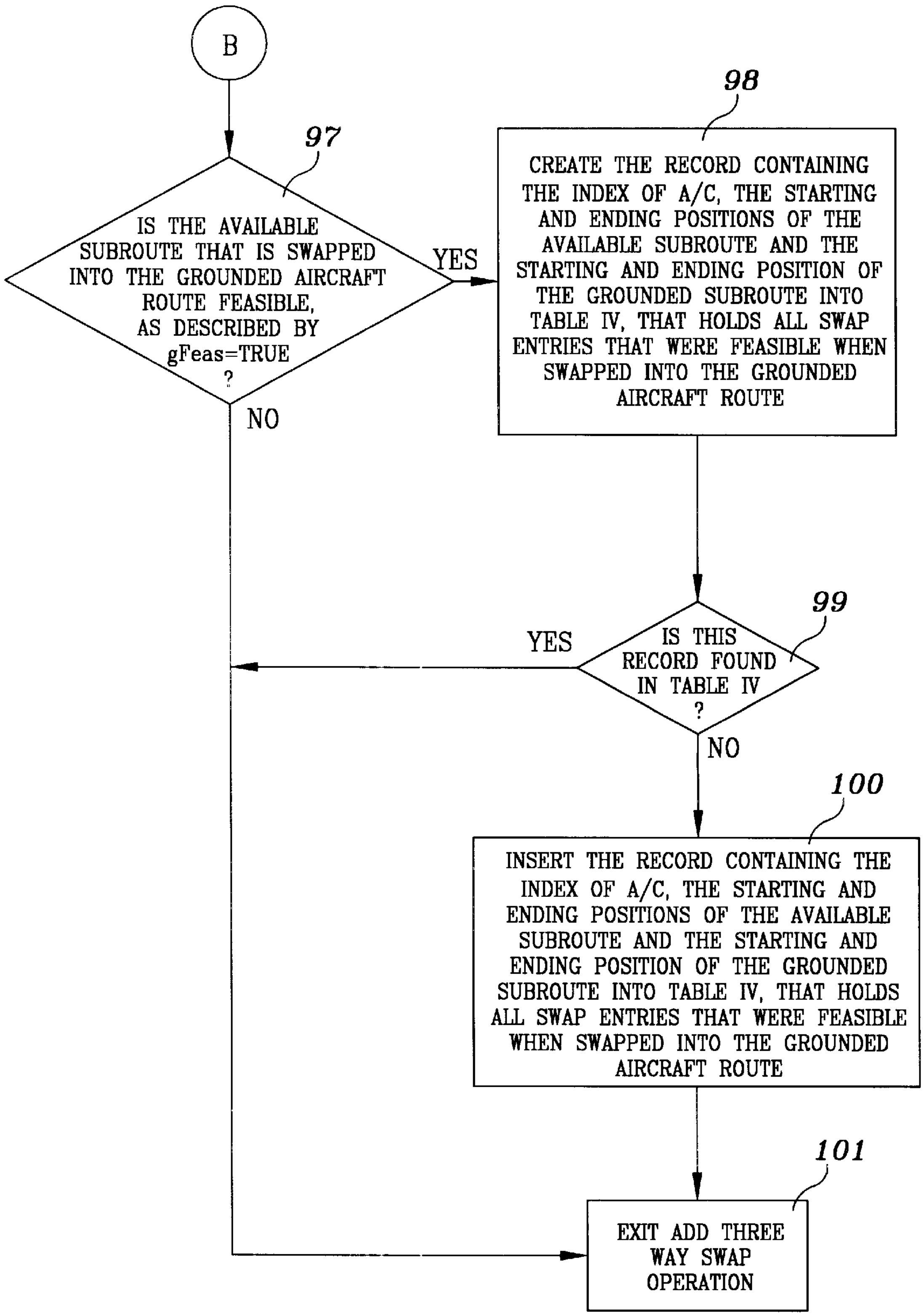

Referring to FIGS. 6A and 6B, a logic flow diagram of the Add Swap Candidate Operation to be performed by the Aircraft Optimization Engine 3 of FIG. 1 is illustrated. The Add Swap Candidate Operation is but one variant operation used to build the tables for the execution of Tertiary Operations. More particularly, at logic step 90 of FIG. 6A, the feasibility "gFeas" of an Available Subroute placed in a Grounded Aircraft Route, and "aFeas" of a Grounded Subroute placed in an Available Aircraft Route in a prior Binary Swap Operation are identified. Also, the current Available Aircraft A/C is identified. Lastly, the first and last flights of the Grounded Subroute, gsStart and gsEnd, that were swapped from the Grounded Aircraft Route into the Available Aircraft Route, and the first and last flights of the Available Subroute, asStart and asEnd, that were swapped into the Grounded Aircraft Route are identified. From logic step 90, the logic flow process proceeds to logic step 91 to extract the starting and ending positions, asStart and asEnd, of the Available Subroute.

The logic flow process continues from logic step 91 to logic step 92 to extract the index (identity) of the Available Aircraft A/C. As before stated each Available Aircraft has an index that is used as a tag to identify the aircraft. From logic step 92, the logic flow process moves to logic step 93 where aFeas is queried for its true/false Boolean value. If the Boolean value of aFeas is found to be false, the logic flow process proceeds from logic step 93 through node B to logic step 97. If the Boolean value of aFeas is found to be true, the logic flow process continues from logic step 93 to logic step 94 to create a new table entry that contains gsStart and gsEnd, the starting and ending positions of the Grounded Subroute of logic step 90, which correspond to the table fields gH and gT, respectively. These parameters represent the start and ending positions of the Grounded Subroute that was swapped into the Available Aircraft Route in the prior Binary Swap Operations. Also, the tag index of the Available Aircraft is placed in the table field, idx. As well, the parameters asStart and asEnd, from logic step 90, are placed in the table fields aH and aT, respectively. These parameters represent the start and ending positions of the Available Subroute that was swapped into the Grounded Aircraft Route in the prior Binary Swap Operations.

The logic flow process next moves from logic step 94 to logic step 95, where a query is performed to determine whether the record of logic step 94 already resides in Table V. If a table entry is found that matches the information in the newly created table entry, the logic flow process jumps through node B to logic step 97. If no table entries are found at logic step 95, however, the logic flow process continues from logic step 95 to logic step 96 to insert the record of logic step 94 into Table V.

Thereafter, the logic flow process proceeds from logic step 96 through node B to logic step 97, where gFeas is queried for its Boolean value. If the Boolean value is found to be true, the logic flow process moves to logic step 98. If the Boolean value at logic step 97 is found to be false, however, the logic flow process continues from logic step 97 to logic step 101, where the Add Three Way Swap Operation is exited.

At logic step 98, a new table entry is created that contains gsStart and gsEnd, the starting and ending positions of the Grounded Subroute of logic step 90, which correspond to the table fields gH and gT, respectively. These parameters represent the start and ending positions of the Grounded Subroute that was swapped into the Available Aircraft Route in the prior Binary Swap Operations. Also, the tag index of the Available Aircraft is placed in the table field, idx. As well, the parameters asStart and asEnd of the Available Subroute of logic step 90 are placed in the table fields aH and aT, respectively. These parameters represent the start and ending positions of the Available Subroute that was swapped into the Grounded Aircraft Route in the prior Binary Swap Operations. The logic flow process then continues to logic step 99, where a query is performed to determine if the record checked in logic step 98 already resides in Table IV. If a table entry is found that matches the information in the newly created table entry, the logic flow process jumps to logic step 101. If no matching table entries are found at logic step 99, however, the logic flow process continues from logic step 99 to logic step 100 to insert the new table entry of logic step 98 into Table IV. The logic flow process then continues from logic step 100 to logic step 101, where the Add Three Way Swap Operation is exited.

Figure 7B:
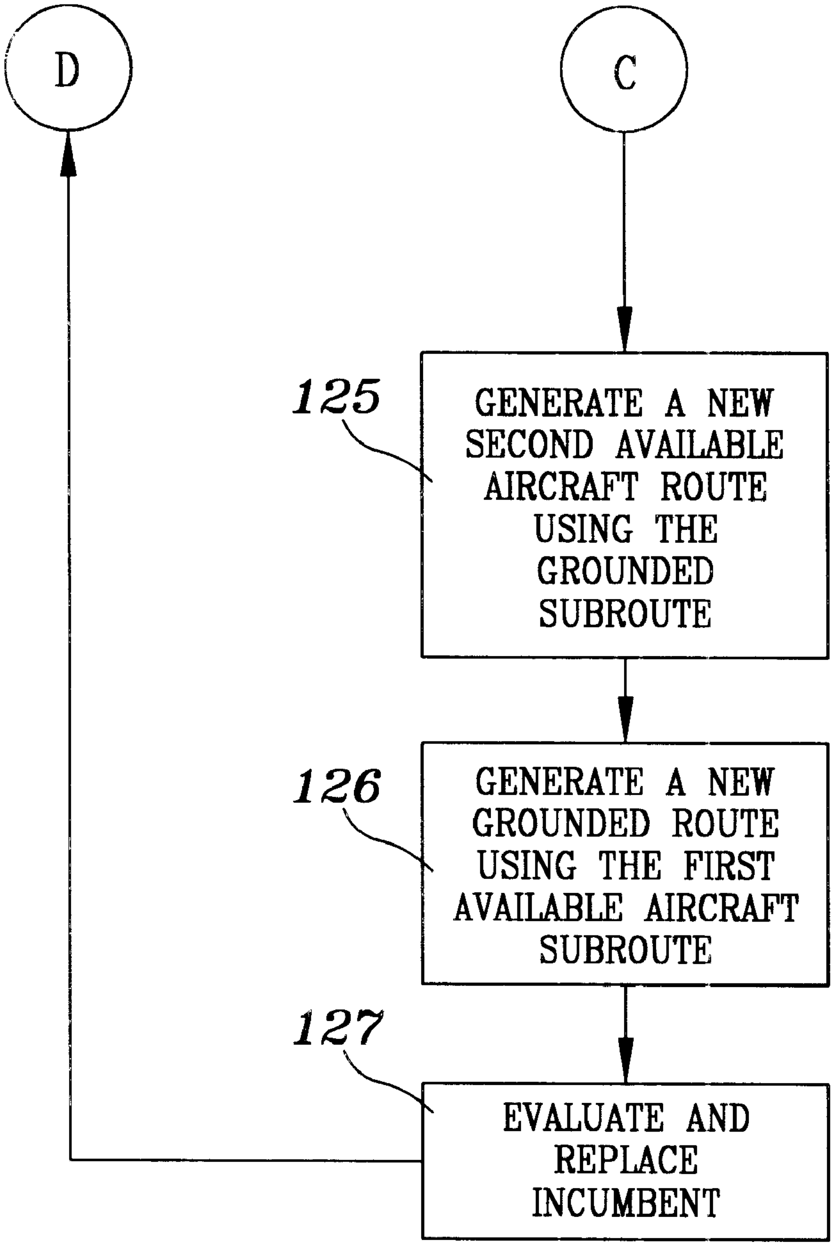

Referring to FIGS. 7A and 7B, the logic steps to be performed by the Aircraft Optimization Engine 3 of FIG. 1 in executing a Three-Way Swap in accordance with the invention, and comprising part of the Tertiary Operations of FIG. 4 are illustrated. More particularly, at logic step 110 of FIG. 7A, the Three-Way Swap Operation in accordance with the invention is entered. The logic flow process then proceeds to logic step 111 to select from Table IV a first of Available Subroute entries that were found to be feasible when swapped into the Grounded Aircraft Route during the prior Binary Swap Operations and to point to row one in Table V.

From logic step 111, the logic flow process continues to logic step 112 to obtain and identify the starting and ending flights, gH and gT, of the Grounded Subroute entry selected at logic step 111. These flights are used to key into the Table V Grounded Subroute entries that were found to be feasible when swapped into the Available Aircraft Route during the prior Binary Operations. The logic flow process then moves from logic step 112 to logic step 113 to issue a query to determine whether an entry in the Available Feasible Swap Table V corresponds to a key using the starting and ending flights of the Grounded Subroute, gH and gT, that were selected in logic step 112. If a match is not found, the logic flow process proceeds from logic step 113 to logic step 116 to determine if there are more entries in Table V of logic step 111. If a match is found at logic step 113, however, the logic flow process continues from logic step 113 to logic step 114 where the record entry of Table V identified by the starting and ending points gH and gT of logic step 112 is accessed.

From logic step 114, the logic flow process moves to logic step 115 to determine whether the second Available Aircraft index obtained from Table V is the same as the first Available Aircraft index obtained from the Table IV record of logic step 111. If the two aircraft are the same, the logic flow process proceeds to logic step 116, where a search for more entries in the Available Feasible Swap Table V is performed. If the available aircrafts are different, the logic flow process moves from logic step 115 to logic step 121.

If more entries are found in the Available Feasible Swap Table V at logic step 116, the logic flow process moves to logic step 117, which will point to the next row in the Available Feasible Swap Table. From logic step 117, the logic flow process loops back to logic step 113 to continue as before described. If no more entries are found in the Available Feasible Swap Table at logic step 116, however, the logic flow process moves from logic step 116 to logic step 118 to search for more entries in the Grounded Feasible Swap Table IV. If no more entries are found in the Grounded Feasible Swap Table, the logic flow process exits the Three-Way Swap Operation at logic step 119. Otherwise, the logic flow process moves from logic step 118 to logic step 120 to select a next record in the Grounded Feasible Swap Table and to reset the pointer in Table V to row 1. From logic step 120, the logic flow process proceeds to logic step 112 to continue as before described.

At logic step 121, a determination is made whether there are any restrictions which would disallow the First Available Aircraft from flying the subroute of the Second Available Aircraft. If there is such a restriction, and the First Available Aircraft cannot fly the indicated subroute of the Second Available Aircraft, the logic flow process proceeds from logic step 121 to logic step 116 to continue as before described. If no restrictions are found at logic step 121, however, the logic flow process continues to logic step 122 to generate a new First Available Aircraft Route by using a combination of part of the original first Available Aircraft Route and the second Available Subroute. The logic flow process then proceeds from logic step 122 to logic step 123 to evaluate the feasibility of the new first Available Aircraft Route. That is, a determination is made whether time and space constraints have been satisfied.

From logic step 123, the logic flow process continues to logic step 124 to query the feasibility of the newly created Available Aircraft Route. If the new first Available Aircraft Route is not feasible, the logic flow process returns to logic step 116 to continue as before described. If the new first Available Aircraft Route is feasible, however, the logic flow process moves from logic step 124, through node C to logic step 125 to generate a new second Available Aircraft Route using part of the original second Available Aircraft Route and the Grounded Subroute. Thereafter, the logic flow process proceeds to logic step 126 to generate a new Grounded Aircraft Route using a combination of part of the original Grounded Aircraft Route and the first Available Subroute. From logic step 126, the logic flow process continues to logic step 127 to evaluate the newly generated aircraft routes, and then return through node D to logic step 116 to continue as before described.

Figure 8:
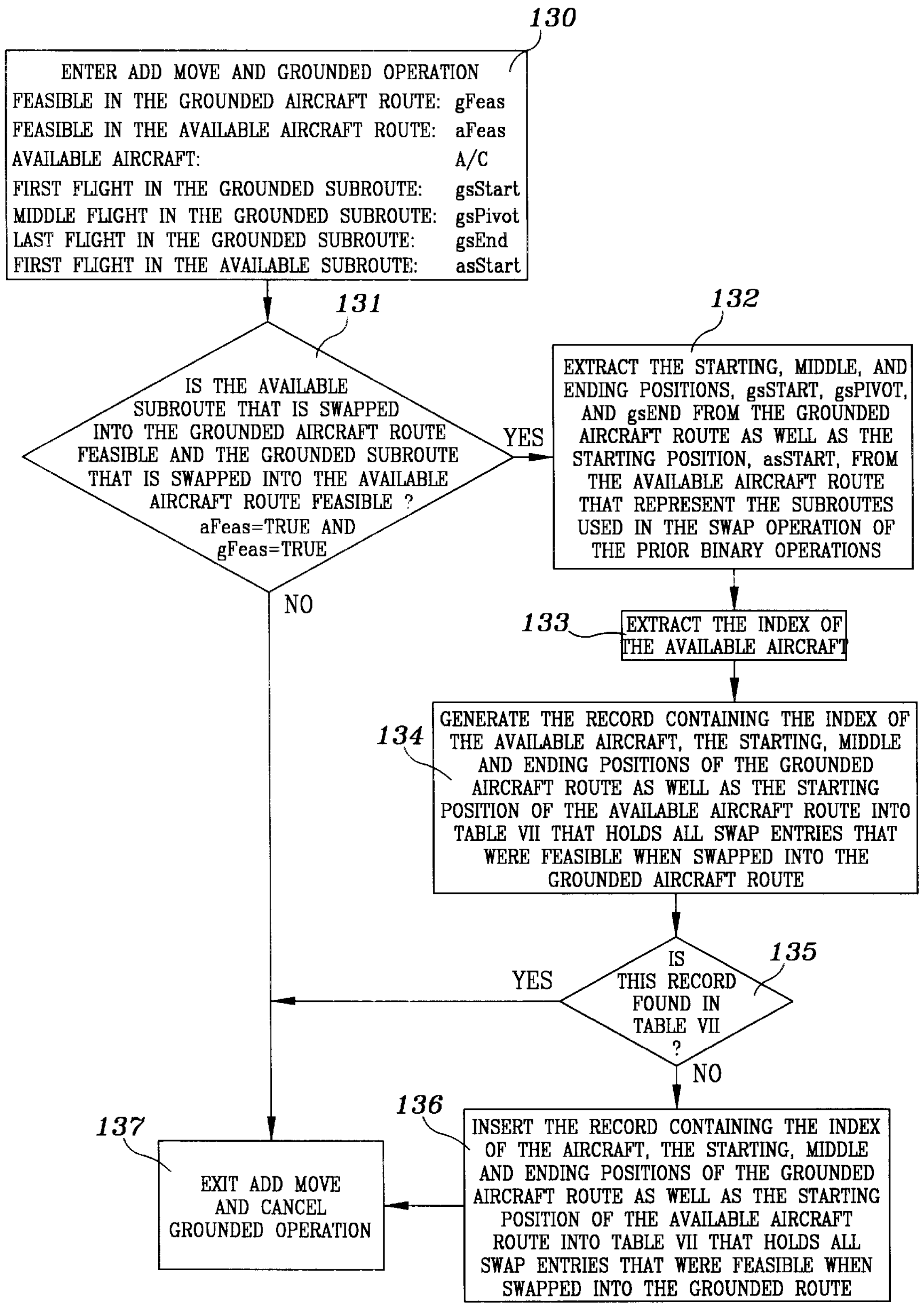
FIG. 8 is a logic flow diagram of the invention in executing an Add Move And Cancel Grounded Candidates Operation.

Referring to FIG. 8, an Add Move And Cancel Grounded Candidate Operation to be performed by the Aircraft Optimization Engine 3 of FIG. 1 is illustrated in logic flow diagram form. The operation is another variant used to build the tables necessary for the execution of a Tertiary Operation. More particularly, at logic step 130 of FIG. 8, the logic flow process enters the operation and proceeds to evaluate the feasibility of a prior Move And Cancel From Source Operation in both the Grounded Aircraft Route (gFeas), and the Available Aircraft Route (aFeas). In addition, the current Available Aircraft (AC), the first, middle and last flights of the Grounded Subroute (respectively gsStart, gsPivot and gsEnd), and the first flight of the Available Subroute (asStart) are identified. From logic step 130, the logic flow process continues to logic step 131, where aFeas and gFeas are queried for their Boolean values. If either value is found to be false, the logic flow process continues to logic step 137 to exit the operation. If both values are found to be true, however, the logic flow process moves from logic step 131 to logic step 132 to extract the starting, middle and ending positions , gsStart, gsPivot and gsEnd, respectively. These positions represent the start and middle positions of the Grounded Subroute that was inserted into the Available Aircraft Route, and the middle and ending positions that were canceled in the Move And Cancel From Source Operation of the prior Binary Operations.

From logic step 132, the logic flow process moves to logic step 133 to extract the index of the Available Aircraft identified in logic step 130. The index is used as a tag to identify each Available Aircraft. From logic step 133, the logic flow process continues to logic step 134 to create a new entry in Table VII below that contains gsStart, gspivot, and gsend, the starting, middle and ending positions of logic step 130, which correspond to the table fields gH, gP and gT, respectively. These parameters represent the start, middle and ending positions of the Grounded Subroute that was moved into the Available Aircraft Route, and canceled in the prior Binary Swap Operations. Also, the tag index of the Available Aircraft is placed in the table field, idx. Further, the parameter asStart from logic step 130 is placed in the aH and aT fields of a Grounded Feasible Move And Cancel Table VII. This parameter represents the starting position of the Available Subroute where the Grounded Aircraft Subroute was placed in the prior Binary Swap Operations. The table entry field, aP, is loaded with the value "−1" to denote that that field is not used.

Table VII is a variant of Table IV, with the following fields:

gH: index of the start of the Grounded Subroute.

gP: index of the pivot point within the Grounded Subroute.

gT: index of the end of the Grounded Subroute.

idx: Available Aircraft identifier.

aH: index of the start of the Available Subroute.

aP: index of the pivot point within the Available Subroute.

aT: index of the end of the Available Subroute.

This type of table is created by those of the prior Binary Operations which separate a Grounded Subroute or an Available Subroute into two segments. The pivot point, gP, represents the point at which the Grounded Subroute is split into two subroutes. A record entry of Table VII is shown below.

TABLE VII

| gH | gP | gT | idx | aH | aP | aT |
|---|---|---|---|---|---|---|
| 0 | 3 | 6 | 1 | 2 | −1 | 4 |

The logic flow process of FIG. 8 next moves from logic step 134 to logic step 135 where a query is made to determine if the record created at logic step 134 already resides in Table VII. If a table entry is found that matches the information in the newly created table entry, the logic flow process jumps from logic step 135 to logic step 137, where the process exits the Add Move And Cancel Grounded Operation. If no matching table entries are found at logic step 135, however, the logic flow process continues from logic step 135 to logic step 136 to insert the new table entry of logic step 134 into Table VII. From logic step 136, the logic process moves to logic step 137 to exit as before described.

Figure 9:
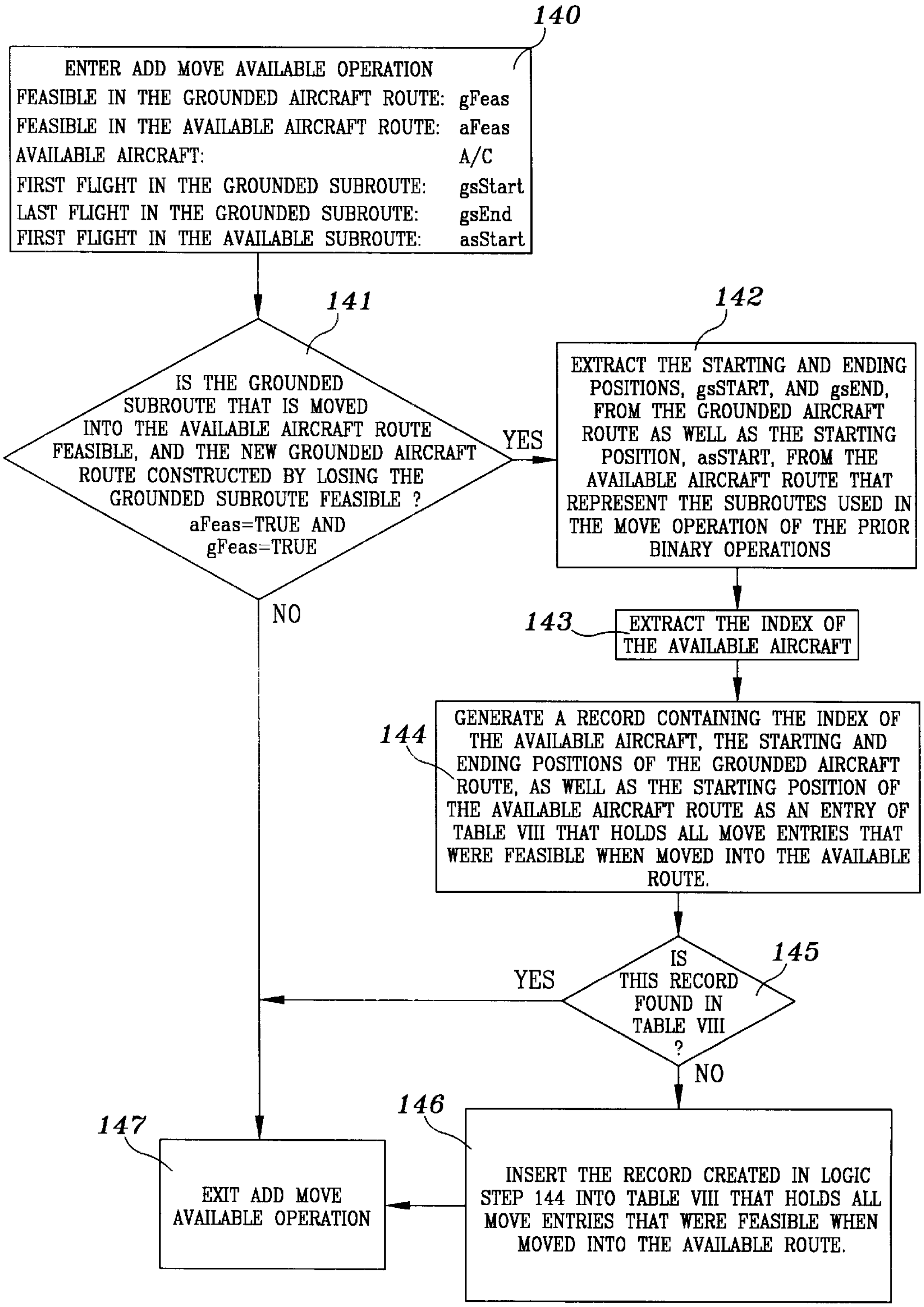
FIG. 9 is a logic flow diagram of the invention in executing an Add Move Available Candidates Operation.

Referring to FIG. 9, an Add Move Available Candidates Operation to be performed by the Aircraft Optimization Engine 3 of FIG. 1 is illustrated in logic flow diagram form. The operation is used to build the tables necessary for the execution of a variant of a Tertiary Operation. More particularly, at logic step 140 of FIG. 9, the logic flow process enters the operation and proceeds to evaluate the feasibility of a prior Move Operation in both the Grounded Aircraft Route (gFeas), and the Available Aircraft Route (aFeas). In addition, the current Available Aircraft (AC), the first and last flights of the Grounded Subroute (respectively gsStart and gsEnd), and the first flight of the Available Subroute (asStart) are identified. From logic step 140, the logic flow process continues to logic step 141, where aFeas and gFeas are queried for their Boolean values. If either value is found to be false, the logic flow process continues to logic step 147 to exit the operation. If both values are found to be true, however, the logic flow process moves to logic step 142 to extract the starting and ending positions , gsStart and gsEnd, from the Grounded Aircraft Route. These positions represent the starting and ending positions that were moved to the Available Route from the Move Operation of the prior Binary Operations. In addition, the starting position asStart is extracted from the Available Aircraft Route.

From logic step 142, the logic flow process moves to logic step 143 to extract the index of the Available Aircraft identified in logic step 140. The index is used as a tag to identify each Available Aircraft. From logic step 143, the logic flow process continues to logic step 144 to create a new table entry that contains gsStart and gsEnd of logic step 140.

These parameters represent the starting and ending positions of the Grounded Subroute that was moved into the Available Aircraft Route in the prior Binary Swap Operations. Also, the tag index of the Available Aircraft is placed in the table field, idx. Further, the parameter asStart, from logic step 100, is placed in the table fields aH and aT. This parameter represents the starting position of the Available Subroute where the Grounded Aircraft Subroute was placed in the prior Binary Swap Operations. The table entry field, aT, is loaded with the value "−1" to denote that the field is not used.

The logic flow process next moves from logic step 144 to logic step 145, where a query is performed to determine whether the record created at logic step 144 already resides in Table III. If a table entry is found that matches the information in the newly created record, the logic flow process jumps to logic step 147, where the process exits the Add Move Available Operation. If no matching table entries are found at logic step 145, however, the logic flow process continues from logic step 145 to logic step 146 to insert the new table entry into Table VIII. From logic step 146, the logic flow process moves to logic step 147 to exit as described previously.

Figure 10A:
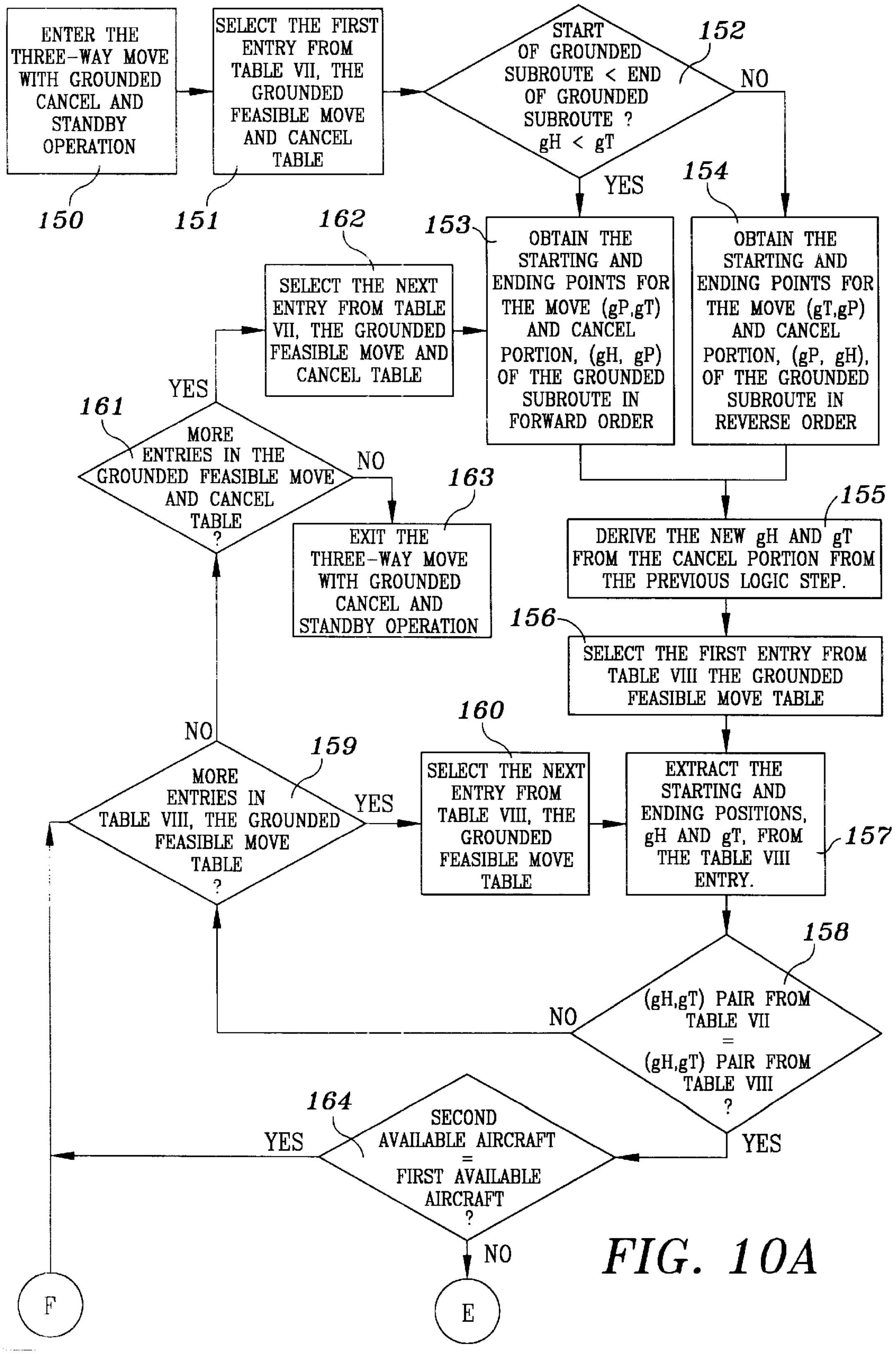
FIGS. 10A and 10B are logic flow diagrams of the invention in executing a Three-Way Move With Grounded Cancel And Standby Operation.
Figure 10B:
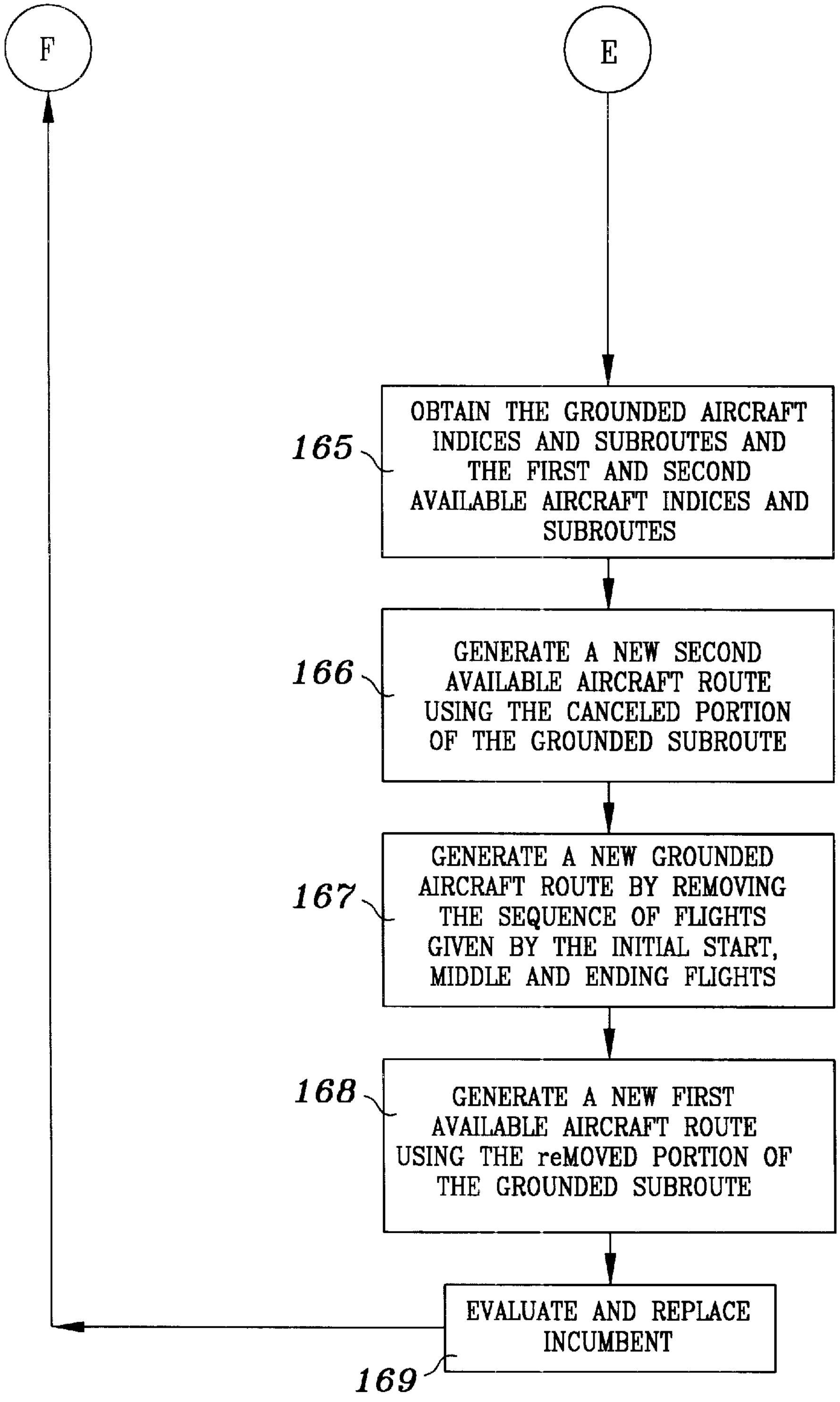

Referring to FIGS. 10A and 10B, the logic steps to be performed by the Aircraft Optimization Engine 3 of FIG. 1 in executing a Three-Way Move With Grounded Cancel And Standby Operation is illustrated. More particularly, at logic step 150 of FIG. 10A, a Three-Way Move With Grounded Cancel And Standby Operation is entered, and the logic flow process thereafter proceeds to logic step 151 to select a first entry the Standby Grounded Feasible Move and Cancel Table that is comprised of entries that were found to be feasible when moved into a Available Aircraft Route and the Grounded Aircraft Route during the prior Binary Operations. From logic step 151, the logic flow process continues to logic step 152, where a determination is made as to whether the Canceled portion of the Grounded Subroute selected at logic step 151 occurs before or after the Move portion of the Grounded Subroute. This query is performed by checking whether the start of the Grounded Subroute, gH, is less than the end of the Grounded Subroute, gT. If the Canceled portion occurs first, the logic flow process proceeds to logic step 153 where the starting and ending points of the Grounded Subroute for the Move portion, gP and gT, and the Cancel portion, gH and gP, are identified in their forward order. Thereafter, the logic flow process moves to logic step 155.

An entry in the table for a Three-Way Move With Grounded Cancel And Standby Operation is shown below in Table VIII:

TABLE VIII

| gH | gT | idx | aH | aT |
|---|---|---|---|---|
| 3 | 6 | 2 | 3 | 3 |

If the Move portion of the Grounded Subroute precedes the Canceled portion at logic step 152, the logic flow process moves from logic step 152 to logic step 154 to identify the starting and ending points for the Grounded Subroute for the Move portion, gT and gP, and the Cancel portion, gP and gH, respectively, in their reverse order. From logic step 154, the logic flow process proceeds to logic step 155 to derive the new and final starting and ending points of the Grounded Subroute from the preceding one of logic step 153 or logic step 154. Thereafter, the logic flow process moves to logic step 156, where the first entry from Table III, the Grounded Feasible Move Table, will be extracted. The logic flow then proceeds to logic step 157 to extract the starting and ending positions, gH and gT, of the Grounded Subroute from Table III, and then continues to logic step 158. At logic step 158, a determination is made whether the starting and ending points , gH and gT, in the table entry from Table VII of logic step 155 are equivalent to the starting and ending points, gH and gT, of the Grounded Subroute in the entry from Table VIII. If false, the logic flow process moves from logic step 158 to logic step 159 to determine whether there are any additional entries in the Grounded Feasible Move Table III. If true, the logic flow process moves from logic step 159 to logic step 160 to select the next entry from Table VIII, the Grounded Feasible Move Table. If no more entries are found at logic step 159, however, the logic flow process proceeds to logic step 161 to determine whether any more entries occur in the Grounded Feasible Move And Cancel Table VII. If not, the logic flow process exits the Three-Way Move With Grounded Cancel And Standby Operation at logic step 163. If further entries are found at logic step 161, however, the logic flow process moves to logic step 162 to select a next entry from Table VII. Thereafter, the logic flow process returns to logic step 153 to continue as before described.

If at logic step 158 the starting and ending positions of the Grounded Subroute found in Table VII are found to be equal to the starting and ending positions of the Grounded Subroute in Table VII, the logic flow process continues to logic step 164 to determine whether the first Available Aircraft and the second Available Aircraft are the same. If not, the logic flow process moves through node E to logic step 165. If the first Available Aircraft and the second Available Aircraft are the same, however, the logic flow process returns to logic step 159 to continue as before described.

TABLE IX

OperationsCgCa::ThreeWaySwap() groundedTimeFeas : 1 availableTimeFeas : 1 secondTimeFeas : 1

| | | | | | | | | | | | | | | | | | | | |
|---|---|---|---|---|---|---|---|---|---|---|---|---|---|---|---|---|---|---|---|
| | | | | | | | | | | | | Original Routes | | | | | | | |
| Grounded | (508) | IAH | (0597) | MTY | MTY | (0594) | IAH | IAH | (0593) | MTY | MTY | (0596) | IAH | IAH | (1060) | STL | STL | (1067) | IAH |
| Available | (534) | IAH | (1962) | SAT | SAT | (1650) | IAH | IAH | (1650) | TUL | TUL | (1653) | IAH | IAH | (1766) | SDF | SDF | (1769) | IAH |
| Second | (507) | IAH | (1865) | MAF | MAF | (1606) | IAH | IAH | (1606) | CLT | CLT | (0599) | IAH | IAH | (0599) | MTY | MTY | (0592) | IAH |
| | | | | | | | | | | | | New Routes | | | | | | | |
| Grounded | (508) | IAH | (1962) | SAT | SAT | (1650) | IAH | IAH | (0593) | MTY | MTY | (0596) | IAH | IAH | (1060) | STL | STL | (1067) | IAH |
| Available | (534) | IAH | (1865) | MAF | MAF | (1606) | IAH | IAH | (1650) | TUL | TUL | (1653) | IAH | IAH | (1766) | SDF | SDF | (1769) | IAH |
| Second | (507) | IAH | (0597) | MTY | MTY | (0594) | IAH | IAH | (1606) | CLT | CLT | (0599) | IAH | IAH | (0599) | MTY | MTY | (0592) | IAH |

TABLE X

OperationsCgCa::ThreeWaySwapWithAvailableCancelAndStandby() groundedTimeFeas : 1 availableTimeFeas : 1 secondTimeFeas : 1

| | | | | | | | | | | | | | | | | | | | | | | | |
|---|---|---|---|---|---|---|---|---|---|---|---|---|---|---|---|---|---|---|---|---|---|---|---|
| | | | | | | | | | | | | Original Routes | | | | | | | | | | | |
| Grounded | (525) | CLE | (0663) | MDW | MDW | (0662) | CLE | CLE | (0662) | ATL | ATL | (1225) | CLE | CLE | (1225) | MCI | MCI | (1228) | CLE | | | | |
| Available | (563) | BDL | (1283) | CLE | CLE | (1283) | ATL | ATL | (1282) | CLE | CLE | (1282) | DCA | DCA | (1119) | CLE | CLE | (0284) | LGA | | | | |
| Second | (539) | MCI | (1228) | CLE | CLE | (1228) | BWI | BWI | (0667) | CLE | CLE | (0667) | MDW | MDW | (1412) | CLE | CLE | (1234) | BDL | | | | |
| | | | | | | | | | | | | New Routes | | | | | | | | | | | |
| Grounded | (525) | CLE | (0663) | MDW | MDW | (0662) | CLE | CLE | (0662) | ATL | ATL | (1225) | CLE | CLE | (0284) | LGA | | | | | | | |
| Available | (563) | BDL | (1283) | CLE | CLE | (1283) | ATL | ATL | (1282) | CLE | CLE | (1225) | MCI | MCI | (1228) | CLE | | | | | | | |
| Second | (539) | MCI | (1228) | CLE | CLE | (1228) | BWI | BWI | (0667) | CLE | CLE | (0667) | MDW | MDW | (1412) | CLE | CLE | (1282) | DCA | DCA | (1119) | CLE | CLE (1234) BDL |

TABLE XI

OperationsCgCa::ThreeWayMoveWithAvailableCancelAndStandby() groundedTimeFeas : 1 availableTimeFeas : 1 secondTimeFeas : 1

| | | | | | | | | | | | | | | | | | | | | | | | |
|---|---|---|---|---|---|---|---|---|---|---|---|---|---|---|---|---|---|---|---|---|---|---|---|
| | | | | | | | | | | | | Original Routes | | | | | | | | | | | |
| Grounded | (531) | DFW | (0456) | CLE | CLE | (0456) | PHL | PHL | (1055) | CLE | CLE | (1055) | IND | IND | (1056) | CLE | | | | | | | |
| Available | (509) | MCI | (1226) | CLE | CLE | (1059) | IND | IND | (1058) | CLE | CLE | (1058) | BDL | BDL | (0663) | CLE | | | | | | | |
| Second | (539) | CLE | (1228) | BWI | BWI | (0667) | CLE | CLE | (0667) | MDW | MDW | (1412) | CLE | CLE | (1234) | BDL | | | | | | | |
| | | | | | | | | | | | | New Routes | | | | | | | | | | | |
| Grounded | (531) | DFW | (0456) | CLE | CLE | (1055) | IND | IND | (1056) | CLE | | | | | | | | | | | | | |
| Available | (509) | MCI | (1226) | CLE | CLE | (0456) | PHL | PHL | (1055) | CLE | CLE | (1058) | BDL | BDL | (0663) | CLE | | | | | | | |
| Second | (539) | CLE | (1228) | BWI | BWI | (0667) | CLE | CLE | (1059) | IND | IND | (1058) | CLE | CLE | (0667) | MDW | MDW | (1412) | CLE | CLE | (1234) | BDL | |

TABLE XII

OperationsCgCa::ThreeWaySwapWithGroundedCancelAndStandby() groundedTimeFeas : 1 availableTimeFeas : 1 secondTimeFeas : 1

Original Routes

| | | | | | | | | | | | | | | | | | | |
|---|---|---|---|---|---|---|---|---|---|---|---|---|---|---|---|---|---|---|
| Grounded | (563) | ATL | (1282) | CLE | CLE | (1282) | DCA | DCA | (1119) | CLE | CLE | (0284) | LGA | LGA | (0491) | CLE | | |
| Available | (509) | IND | (1058) | CLE | CLE | (1058) | BDL | BDL | (0663) | CLE | | | | | | | | |
| Second | (531) | CLE | (0456) | PHL | PHL | (1055) | CLE | CLE | (1055) | IND | IND | (1056) | CLE | | | | | |

New Routes

| | | | | | | | | | | | | | | | | | | |
|---|---|---|---|---|---|---|---|---|---|---|---|---|---|---|---|---|---|---|
| Grounded | (563) | ATL | (1282) | CLE | CLE | (1058) | BDL | BDL | (0663) | CLE | | | | | | | | |
| Available | (509) | IND | (1058) | CLE | CLE | (0284) | LGA | LGA | (0491) | CLE | | | | | | | | |
| Second | (531) | CLE | (0456) | PHL | PHL | (1055) | CLE | CLE | (1282) | DCA | DCA | (1119) | CLE | CLE | (1055) | IND | IND | (1056) | CLE |

TABLE XIII

OperationsCgCa::ThreeWayMoveWithGroundedCancelAndStandby() groundedTimeFeas : 1 availableTimeFeas : 1 secondTimeFeas : 1

Original Routes

| | | | | | | | | | | | | | | | | | | |
|---|---|---|---|---|---|---|---|---|---|---|---|---|---|---|---|---|---|---|
| Grounded | (508) | IAH | (0597) | MTY | MTY | (0594) | IAH | IAH | (0593) | MTY | MTY | (0596) | IAH | IAH | (1060) | STL | STL | (1067) | IAH |
| Available | (501) | IAH | ( ) | IAH | | | | | | | | | | | | | | |
| Second | (557) | IAH | (1014) | ATL | | | | | | | | | | | | | | |

New Routes

| | | | | | | | | | | | | | | | | | | |
|---|---|---|---|---|---|---|---|---|---|---|---|---|---|---|---|---|---|---|
| Grounded | (508) | IAH | (1060) | STL | STL | (1067) | IAH | | | | | | | | | | | |
| Available | (501) | IAH | (0593) | MTY | MTY | (0596) | IAH | IAH | ( ) | IAH | | | | | | | | |
| Second | (557) | IAH | (0597) | MTY | MTY | (0594) | IAH | IAH | (1014) | ATL | | | | | | | | |

TABLE XIV

OperationsCgCa::ThreeWaySwapWithMove() groundedTimeFeas : 1 availableTimeFeas : 1 secondTimeFeas : 1

Original Routes

| | | | | | | | | | | | | | | | | | | |
|---|---|---|---|---|---|---|---|---|---|---|---|---|---|---|---|---|---|---|
| Grounded | (508) | IAH | (0597) | MTY | MTY | (0594) | IAH | IAH | (0593) | MTY | MTY | (0596) | IAH | IAH | (1060) | STL | STL | (1067) | IAH |
| Available | (501) | IAH | ( ) | IAH | | | | | | | | | | | | | | |
| Second | (507) | IAH | (1865) | MAF | MAF | (1606) | IAH | IAH | (1606) | CLT | CLT | (0599) | IAH | IAH | (0599) | MTY | MTY | (0592) | IAH |

New Routes

| | | | | | | | | | | | | | | | | | | |
|---|---|---|---|---|---|---|---|---|---|---|---|---|---|---|---|---|---|---|
| Grounded | (508) | IAH | (0593) | MTY | MTY | (0596) | IAH | IAH | (1060) | STL | STL | (1067) | IAH | | | | | |
| Available | (501) | IAH | (1865) | MAF | MAF | (1606) | IAH | IAH | ( ) | IAH | | | | | | | | |
| Second | (507) | IAH | (0597) | MTY | MTY | (0594) | IAH | IAH | (1606) | CLT | CLT | (0599) | IAH | IAH | (0599) | MTY | MTY | (0592) | IAH |

TABLE XV

OperationsCgCa::ThreeWaySwapTheDwWay() groundedTimeFeas : 1 availableTimeFeas : 1 secondTimeFeas : 1

| | | | | | | | | | | | | | | | | | | | |
|---|---|---|---|---|---|---|---|---|---|---|---|---|---|---|---|---|---|---|---|
| Original Routes | | | | | | | | | | | | | | | | | | | |
| Grounded | (508) | IAH | (0597) | MTY | MTY | (0594) | IAH | IAH | (0593) | MTY | MTY | (0596) | IAH | IAH | (1060) | STL | STL | (1067) | IAH |
| Available | (534) | IAH | (1962) | SAT | SAT | (1650) | IAH | IAH | (1650) | TUL | TUL | (1653) | IAH | IAH | (1766) | SDF | SDF | (1769) | IAH |
| Second | (506) | DFW | (1768) | IAH | IAH | (1768) | SDF | SDF | (1767) | IAH | IAH | (1862) | GSO | GSO | (1865) | IAH | | | |
| New Routes | | | | | | | | | | | | | | | | | | | |
| Grounded | (508) | IAH | (1962) | SAT | SAT | (1650) | IAH | IAH | (1650) | TUL | TUL | (1653) | IAH | IAH | (1060) | STL | STL | (1067) | IAH |
| Available | (534) | IAH | (0597) | MTY | MTY | (0594) | IAH | IAH | (1768) | SDF | SDF | (1767) | IAH | IAH | (1766) | SDF | SDF | (1769) | IAH |
| Second | (506) | DFW | (1768) | IAH | IAH | (0593) | MTY | MTY | (0596) | IAH | IAH | (1862) | GSO | GSO | (1865) | IAH | | | |

TABLE XVI

OperationsCgCa::ThreeWaySwapAndCancelAvailableAndGrounded() groundedTimeFeas : 1 availableTimeFeas : 1 secondTimeFeas : 1

| | | | | | | | | | | | | | | | | | | | | | | |
|---|---|---|---|---|---|---|---|---|---|---|---|---|---|---|---|---|---|---|---|---|---|---|
| Original Routes | | | | | | | | | | | | | | | | | | | | | | |
| Grounded | (525) | CLE | (0663) | MDW | MDW | (0662) | CLE | CLE | (0662) | ATL | ATL | (1225) | CLE | CLE | (1225) | MCI | MCI | (1228) | CLE | | | |
| Available | (563) | BDL | (1283) | CLE | CLE | (1283) | ATL | ATL | (1282) | CLE | CLE | (1282) | DCA | DCA | (1119) | CLE | CLE | (0284) | LGA | | | |
| Second | (543) | PHL | (1427) | CLE | CLE | (0674) | PHL | PHL | (1293) | CLE | CLE | (1293) | ATL | ATL | (1294) | CLE | CLE | (1294) | PHL | | | |
| New Routes | | | | | | | | | | | | | | | | | | | | | | |
| Grounded | (525) | CLE | (1282) | DCA | DCA | (1119) | CLE | CLE | (0284) | LGA | | | | | | | | | | | | |
| Available | (563) | BDL | (1283) | CLE | CLE | (1283) | ATL | ATL | (1294) | CLE | CLE | (1294) | PHL | | | | | | | | | |
| Second | (543) | PHL | (1427) | CLE | CLE | (0674) | PHL | PHL | (1293) | CLE | CLE | (1293) | ATL | ATL | (1225) | CLE | CLE | (1225) | MCI | MCI | (1228) | CLE |
| Phantom1 | | ATL | (1282) | CLE | | | | | | | | | | | | | | | | | | |
| Phantom2 | | CLE | (0663) | MDW | MDW | (0662) | CLE | CLE | (0662) | ATL | | | | | | | | | | | | |

TABLE XVII

OperationsCgCa::ThreeWaySwapAndCancelAvailableAndSecond() groundedTimeFeas : 1 availableTimeFeas : 1 secondTimeFeas : 1

| | | | | | | | | | | | | | | | | | | | |
|---|---|---|---|---|---|---|---|---|---|---|---|---|---|---|---|---|---|---|---|
| Original Routes | | | | | | | | | | | | | | | | | | | |
| Grounded | (525) | CLE | (0663) | MDW | MDW | (0662) | CLE | CLE | (0662) | ATL | ATL | (1225) | CLE | CLE | (1225) | MCI | MCI | (1228) | CLE |
| Available | (563) | BDL | (1283) | CLE | CLE | (1283) | ATL | ATL | (1282) | CLE | CLE | (1282) | DCA | DCA | (1119) | CLE | CLE | (0284) | LGA |
| Second | (543) | PHL | (1427) | CLE | CLE | (0674) | PHL | PHL | (1293) | CLE | CLE | (1293) | ATL | ATL | (1294) | CLE | CLE | (1294) | PHL |
| New Routes | | | | | | | | | | | | | | | | | | | |
| Grounded | (525) | CLE | (0663) | MDW | MDW | (0662) | CLE | CLE | (1282) | DCA | DCA | (1119) | CLE | CLE | (0284) | LGA | | | |
| Available | (563) | BDL | (1283) | CLE | CLE | (1283) | ATL | ATL | (1294) | CLE | CLE | (1294) | PHL | | | | | | |
| Second | (543) | PHL | (1427) | CLE | CLE | (0662) | ATL | ATL | (1225) | CLE | CLE | (1225) | MCI | MCI | (1228) | CLE | | | |
| Phantom1 | | ATL | (1282) | CLE | | | | | | | | | | | | | | | |
| Phantom2 | | CLE | (0674) | PHL | PHL | (1293) | CLE | CLE | (1293) | ATL | | | | | | | | | |

TABLE XVIII

OperationsCgCa::ThreeWaySwapAndCancelAvailable() groundedTimeFeas : 1 availableTimeFeas : 1 secondTimeFeas : 1

Original Routes

| | | | | | | | | | | | | | | | | | | | |
|---|---|---|---|---|---|---|---|---|---|---|---|---|---|---|---|---|---|---|---|
| Grounded | (508) | IAH | (0597) | MTY | MTY | (0594) | IAH | IAH | (0593) | MTY | MTY | (0596) | IAH | IAH | (1060) | STL | STL | (1067) | IAH |
| Available | (534) | IAH | (1962) | SAT | SAT | (1650) | IAH | IAH | (1650) | TUL | TUL | (1653) | IAH | IAH | (1766) | SDF | SDF | (1769) | IAH |
| Second | (507) | IAH | (1865) | MAF | MAF | (1606) | IAH | IAH | (1606) | CLT | CLT | (0599) | IAH | IAH | (0599) | MTY | MTY | (0592) | IAH |

New Routes

| | | | | | | | | | | | | | | | | | | | |
|---|---|---|---|---|---|---|---|---|---|---|---|---|---|---|---|---|---|---|---|
| Grounded | (508) | IAH | (1962) | SAT | SAT | (1650) | IAH | IAH | (0593) | MTY | MTY | (0596) | IAH | IAH | (1060) | STL | STL | (1067) | IAH |
| Available | (534) | IAH | (1865) | MAF | MAF | (1606) | IAH | IAH | (1606) | CLT | CLT | (0599) | IAH | IAH | (1766) | SDF | SDF | (1769) | IAH |
| Second | (507) | IAH | (0597) | MTY | MTY | (0594) | IAH | IAH | (0599) | MTY | MTY | (0592) | IAH | | | | | | |
| Phantom1 | | IAH | (1650) | TUL | TUL | (1653) | IAH | | | | | | | | | | | | |

TABLE XIX

OperationsCgCa::ThreeWaySwapAndCancelGrounded() groundedTimeFeas : 1 availableTimeFeas : 1 secondTimeFeas : 1

Original Routes

| | | | | | | | | | | | | | | | | | | | |
|---|---|---|---|---|---|---|---|---|---|---|---|---|---|---|---|---|---|---|---|
| Grounded | (508) | IAH | (0597) | MTY | MTY | (0594) | IAH | IAH | (0593) | MTY | MTY | (0596) | IAH | IAH | (1060) | STL | STL | (1067) | IAH |
| Available | (506) | DFW | (1768) | IAH | IAH | (1768) | SDF | SDF | (1767) | IAH | IAH | (1862) | GSO | GSO | (1865) | IAH | | | |
| Second | (507) | IAH | (1865) | MAF | MAF | (1606) | IAH | IAH | (1606) | CLT | CLT | (0599) | IAH | IAH | (0599) | MTY | MTY | (0592) | IAH |

New Routes

| | | | | | | | | | | | | | | | | | | | |
|---|---|---|---|---|---|---|---|---|---|---|---|---|---|---|---|---|---|---|---|
| Grounded | (508) | IAH | (1768) | SDF | SDF | (1767) | IAH | IAH | (1060) | STL | STL | (1067) | IAH | | | | | | |
| Available | (506) | DFW | (1768) | IAH | IAH | (1606) | CLT | CLT | (0599) | IAH | IAH | (1862) | GSO | GSO | (1865) | IAH | | | |
| Second | (507) | IAH | (1865) | MAF | MAF | (1606) | IAH | IAH | (0593) | MTY | MTY | (0596) | IAH | IAH | (0599) | MTY | MTY | (0592) | IAH |
| Phantom1 | | IAH | (0597) | MTY | MTY | (0594) | IAH | | | | | | | | | | | | |

At logic step 165, the Grounded Aircraft starting and ending indices, the starting and ending positions of the Grounded Subroutes flown by the Grounded Aircraft, the first Available Aircraft starting and ending indices, the starting and ending positions of the subroutes flown by the first Available Aircraft and the second Available Aircraft starting and ending indices, and the starting and ending positions of the subroutes flown by the second Available Aircraft are determined. The logic flow process then continues to logic step 166 where a new second Available Aircraft Route is generated by using the Canceled portion of the Grounded Subroute. From logic step 166, the logic flow process continues to logic step 167 where a new Grounded Aircraft Route is generated by removing the sequence of flights given by the start, middle, and ending flights, gH, gP and gT, respectively, of the Grounded Subroute.

The logic flow process moves from logic step 167 to logic step 168 to generate a new first Available Aircraft Route by using the portion of the Grounded Subroute removed at logic step 167. The logic flow process then continues from logic step 168 to logic step 169 to evaluate the time and position feasibility of the new Grounded Aircraft Route and the new Available Aircraft Route. If the new routes are feasible, they replace existing routes, and the logic flow process proceeds through node F to logic step 159 to continue as before described. If the new routes are not feasible, the existing routes are not replaced.

Table IX illustrates a Three-Way Swap Cperation in accordance with the invention, which is used to repair a problem in the Grounded Aircraft Route. By "problem" it is meant that the round trip cannot take place because of equipment or crew unavailability. The first line of Table IX shows that the Grounded Aircraft arrived at the IAH airport as aircraft number 508, and that the Grounded Aircraft Route is comprised of six flight segments. In the first subroute, reading from left to right, the Grounded Aircraft is scheduled to fly from IAH to the MTY airport as flight number 0597. In the second subroute, the Grounded Aircraft is scheduled to fly from MTY to IAH as flight number 0594. In the third subroute, the Grounded Aircraft is scheduled to fly from IAH to MTY as flight number 0593, and in the fourth subroute from MTY to IAH as flight number 0596. In the fifth subroute, the Grounded Aircraft is scheduled to fly from IAH to the STL airport as flight number 1060, and in the sixth subroute from STL to IAH as flight number 1067. A review of the Table IX shows that gFeas, $a_1$Feas, and $a_2$Feas have a Boolean value of "1", and G, $A_1$, and $A_2$ must have a solution feasible in both time and space. The solution was obtained by moving the first and second flight segments of $A_1$ into G, moving the first and second flight segments of $A_2$ into $A_1$, and moving the first and second flight segments of G into $A_2$.

Table X illustrates the result of a Three-Way Swap With Available Cancel And Standby Operation, which is used to repair the problem in the Grounded Aircraft Route as shown by the fifth and sixth flight segments of the Grounded Aircraft Route. In achieving a solution with gFeas, $a_1$Feas, and $a_2$Feas having a Boolean value of 1, the sixth subroute of $A_1$ is moved into the fifth subroute position of G, the fourth and fifth flight segments of $A_1$ are moved into the sixth and seventh subroute positions of $A_2$, and the sixth subroute of $A_2$ is delayed. Lastly, the fifth and sixth flight segments of G are moved to the fourth and fifth subroute positions of $A_1$. No cancellations occurred.

Table XI illustrates the result of a Three-Way Move With Available Cancel And Standby Operation, which is used to repair the problem in the Grounded Aircraft Route as shown by the second and third flight segments of the Grounded Aircraft Route. In achieving a solution with gFeas, $a_1$Feas, and $a_2$Feas having a Boolean value of 1, that is a feasible solution, the second and third flight segments of G are moved to the second and third subroute positions of $A_1$, the second and third flight segments of $A_1$ are moved to the third and fourth subroute positions of $A_2$.

Table XII illustrates the result of a Three-Way Swap With Grounded Cancel And Standby Operation, which is used to repair the problem in the Grounded Aircraft Route with flight segments two through five open. A feasible solution is achieved by moving the second and third flight segments of $A_1$ into the second and third subroute positions of G, moving the fourth and fifth flight segments of G into the second and third subroute positions of $A_1$, moving the second and third flight segments of the original G into the third and fourth subroute positions of $A_2$.

Table XIV illustrates the result of a Three-Way Move With Grounded Cancel And Standby Operation, which is used to repair the problem in the Grounded Aircraft Route, as represented by flight segments one through four of the Grounded Aircraft Route. To achieve a feasible solution, flight segments three and four of G are moved to subroute positions one and two of $A_1$, and flight segments one and two of G are moved to subroute positions one and two of $A_2$. Lastly, flight segments five and six of the original G are moved to the subroute positions one and two, respectively, of G.

Table XV illustrates a Three-Way Swap With Move Operation, which is used to repair the problem in the Grounded Aircraft Route shown as flight segments one and two of the Grounded Aircraft Route G. To achieve a feasible solution, flight segments one and two of G are moved to subroute positions one and two of $A_2$, flight segments one and two of $A_2$ are moved to subroute positions one and two of $A_1$, the first subroute of the original $A_1$.

Table XVI illustrates a Three-Way Swap The Dw Way Operation, which is used to repair the problem in the Grounded Aircraft Route as represented by flight segments one through four. To achieve a feasible solution, flight segments one and two of G are moved to subroute positions one and two of $A_1$, flight segments three and four of G are moved to subroute positions two and three of $A_2$, flight segments one through four of $A_1$ are moved to subroute positions one through four of G, and flight segments two and three of $A_2$ are moved to subroute positions three and four of $A_1$.

Table XVII illustrates a Three-Way Swap And Cancel Available And Grounded Operation, which is used to repair the problem in the Grounded Aircraft Route as shown by flight segments one through three of G. To achieve a feasible solution where gFeas, $a_1$Feas, and $a_2$Feas have a Boolean value of 1, flight segments one through three of G are moved to subroute positions one through three respectively of a second phantom route Phantom2, flight segments four through six of $A_1$ are moved to subroute positions one through three respectively of G, the third subroute of $A_1$ is moved to the first subroute position of a first phantom route Phantom 1, and flight segments five and six of $A_2$ are moved to subroute positions three and four respectively of $A_1$. The phantom routes represent canceled flight segments.

Table XVIII illustrates a Three-Way Swap And Cancel Available And Second Operation, which is used to repair the problem in the Grounded Aircraft Route, and between CLE and MCI, as represented respectively by flight segments three through six of G. To achieve a feasible solution, flight segments three through six of G are moved to subroute positions two through five of $A_2$, flight segments four through six of $A_1$ are moved to subroute positions three through five of G, subroute three of the original $A_1$ is moved to subroute position one of Phantom1, and flight segments two through four of the original $A_2$ are moved to subroute positions one through three of Phantom2.

Table XIX illustrates a Three-Way Swap And Cancel Available Operation, which is used to repair the problem in the Grounded Aircraft Route as shown by flight segments one and two of G. To achieve a feasible solution, the first and second flight segments of G are moved to the first and second subroute positions of $A_2$, the first and second flight segments of the original $A_1$ are moved to the first and second subroute positions of G, flight segments one through four of the original $A_2$ are moved to subroute positions one through four of $A_1$, and the third and fourth flight segments of the original $A_1$ are moved to subroute positions one and two respectively of Phantom1

Table XX illustrates a Three-Way Swap And Cancel Grounded Operation, which is used to repair the problem in the Grounded Aircraft Route as represented by flight segments one through four of G. Subroutes one and two of the original G are moved to subroute positions one and two respectively of Phantom1, flight segments two and three of the original $A_1$ are moved to flight segments positions one and two of G, flight segments three and four of $A_2$ are moved to subroute positions two and three of $A_1$, and the third and fourth flight segments of the original G are moved to subroute positions three and four of $A_2$.

It is to be understood that the tools for generating Tertiary Operations have been disclosed, and may be used to perform Tertiary Operations beyond those identified in this specification. Further, through use of these tools a more efficient method for repairing Grounded Aircraft Routes is provided which more nearly approaches the real time requirements of an airline operation.

N-WAY SWAP OPERATION

The method disclosed above for a Three-Way Operation in accordance with the invention may be extended to any number of Available Aircraft Routes. As an example, a representation of three Available Aircraft Routes is shown in Table XXI below.

TABLE XXI

| | 0 | 1 | 2 | 3 | 4 | 5 | 6 | 7 |
|---|---|---|---|---|---|---|---|---|
| G | a | b | c | a | d | b | a | g |
| A1 | x | l | a | m | b | a | l | h |
| A2 | f | g | h | a | b | a | h | x |
| A3 | f | a | b | c | d | a | b | l |

G: Grounded Aircraft Route

A1: first Available Aircraft Route

A2: second Available Aircraft Route

A3: third Available Aircraft Route

Indices: 0,1,2,3,4,5,6,7

Stations: a,b,c,d,g,x,l,m,h,f

The following Table XXII lists pictorially all the feasible Binary Swap Operations that can take place from the above routes:

Grounded Route Indices are those that describe the actual positions of the two stations being swapped out of the Grounded Aircraft Route. The Available Route Indices are those that describe the actual positions of stations that can be swapped out of the first and/or second Available Aircraft Routes. Hence, from the first row of Table XXII, one can observe that the station pair (a,b), which occupy positions (0,1) in the Grounded Aircraft Route can be swapped with the first Available Aircraft Route (A1) stations (a,b) which occupy positions (2,4). The station pair (a,b) which occupy positions (0,1) in the Grounded Aircraft Route also can be swapped with the second Available Aircraft Route (A2) stations (a,b) which occupy positions (3,4), and can be swapped with the third available aircraft's route (A3), stations (a,b) which occupy positions (1,2) and positions (5,6).

TABLE XXII

| Origin Station | Destination Station | Grounded Route Indices | Available Route Indices A1: First Available Route A2: Second Available Route | | | | | |
|---|---|---|---|---|---|---|---|---|
| a | b | G(0,1) | A1(2,4) | A2(3,4) | A3(1,2) | A3(5,6) | | |
| a | a | G(0,3) | A1(2,5) | A2(3,5) | A3(1,5) | | | |
| a | b | G(0,5) | A1(2,4) | A2(3,4) | A3(1,2) | A3(5,6) | | |
| a | a | G(0,6) | A1(2,5) | A2(3,5) | A3(1,5) | | | |
| a | f | G(0,7) | A1(2,7) | A1(5,7) | A2(3,7) | A2(5,7) | A3(1,7) | A3(5,7) |
| b | a | G(1,3) | A1(4,5) | A2(4,5) | | | | |
| b | a | G(1,6) | A1(4,5) | A2(4,5) | A3(2,5) | | | |
| b | f | G(1,7) | A1(4,7) | A2(4,7) | A3(2,7) | A3(6,7) | | |
| a | b | G(3,5) | A1(2,4) | A2(3,4) | A3(1,2) | A3(5,6) | | |
| a | a | G(3,6) | A1(2,5) | A2(3,5) | A3(1,5) | | | |
| a | f | G(3,7) | A1(2,7) | A1(5,7) | A2(3,7) | A2(5,7) | A3(1,7) | A3(5,7) |
| b | a | G(5,6) | A1(4,5) | A2(4,5) | | | | |
| b | f | G(5,7) | A1(4,7) | A2(4,7) | A3(2,7) | A3(6,7) | | |
| a | f | G(6,7) | A1(2,7) | A1(5,7) | A2(3,7) | A2(5,7) | A3(1,7) | A3(5,7) |

The Grounded Feasible Table will contain the following data:

TABLE XXIII

| gH | gT | Idx | aH | aT |
|---|---|---|---|---|
| 0 | 1 | 1 | 2 | 4 |
| 0 | 1 | 2 | 3 | 4 |

TABLE XXIII-continued

| gH | gT | Idx | aH | aT |
|---|---|---|---|---|
| 0 | 1 | 3 | 1 | 2 |
| 0 | 1 | 3 | 5 | 6 |
| 0 | 3 | 1 | 2 | 5 |
| 0 | 3 | 2 | 3 | 5 |
| 0 | 3 | 3 | 1 | 5 |
| 0 | 5 | 1 | 2 | 4 |
| 0 | 5 | 2 | 3 | 4 |
| 0 | 5 | 3 | 1 | 2 |
| 0 | 5 | 4 | 5 | 6 |
| 0 | 6 | 1 | 2 | 5 |
| 0 | 6 | 2 | 3 | 5 |
| 0 | 6 | 3 | 1 | 5 |
| 0 | 7 | 1 | 2 | 7 |
| 0 | 7 | 1 | 5 | 7 |
| 0 | 7 | 2 | 3 | 7 |
| 0 | 7 | 2 | 5 | 7 |
| 0 | 7 | 3 | 1 | 7 |
| 0 | 7 | 3 | 5 | 7 |

The Available Feasible Table will contain the following data:

TABLE XXIV

| gH | gT | idx | aH | aT |
|---|---|---|---|---|
| 0 | 1 | 1 | 2 | 4 |
| 0 | 1 | 2 | 3 | 4 |
| 0 | 1 | 3 | 1 | 2 |
| 0 | 1 | 3 | 5 | 6 |
| 0 | 3 | 1 | 2 | 5 |
| 0 | 3 | 2 | 3 | 5 |
| 0 | 3 | 3 | 1 | 5 |
| 0 | 5 | 1 | 2 | 4 |
| 0 | 5 | 2 | 3 | 4 |
| 0 | 5 | 3 | 1 | 2 |
| 0 | 5 | 4 | 5 | 6 |
| 0 | 6 | 1 | 2 | 5 |
| 0 | 6 | 2 | 3 | 5 |
| 0 | 6 | 3 | 1 | 5 |
| 0 | 7 | 1 | 2 | 7 |
| 0 | 7 | 1 | 5 | 7 |
| 0 | 7 | 2 | 3 | 7 |
| 0 | 7 | 2 | 5 | 7 |
| 0 | 7 | 3 | 1 | 7 |
| 0 | 7 | 3 | 5 | 7 |

Using the above Tables XXIII and XXIV, one can build upon the premise of the Tertiary Operations to extend to N-Way Operations, where N is any whole number greater than or equal to 3. Using the Tertiary Operation variant, the Three-Way Swap, as an example, the methods used to build the Three-Way Swap Operation in accordance with the invention have previously been discussed. With respect to the above tables, such a Three-Way Swap Operation would use row 1 of the Grounded Feasible Table XXIII and row 2 of the Available Feasible Table XXIV as a result of time and space feasibility tests. Once a Three-Way Swap Operation has been found to be feasible in both time and space for the three aircraft routes, G, A1 and A2, the next step is to build a four-Way Operation by continuing the search of the Available Feasible Table XXIV for the same feasibility criterion as before: a corresponding gH and gT in Table XXIV, and an idx index in Table XXIV that is unique with respect to idx of the two previously used Available Aircraft of the Three-Way Swap Operation. If another entry is found in Table XXIV that matches the above criterion, such as row 3 in the Available Feasible Table, then the facts are known as before: The space and time feasibility in the direction of placing the Grounded Aircraft Subroute into the Available Aircraft Route, with an index of “3”, is feasible as shown by logic step 183 of FIG. 11. Following the example of the Three-Way Swap, a Four-Way Swap Operation is comprised of the removal of a first sequence of flights from a Grounded Aircraft Route, the removal of a second sequence of flights from a first Available Aircraft Route, the removal of a third sequence of flights from a second Available Aircraft Route, and the removal of the fourth sequence of flights from the third Available Aircraft Route. Then, the replacement of the first sequence with the second sequence, the replacement of the second sequence with the third sequence, the replacement of the third sequence with the fourth sequence, and the replacement of the fourth sequence with the first sequence. This is shown pictorially in FIG. 11 and FIG. 12 as further described below. To extend this method to an N-Way swap, one needs only to take the feasible solution built from each swapped set of Aircraft Subroutes, such as with the Four-Way Swap Operation above, and follow the same criterion.

Figure 11:
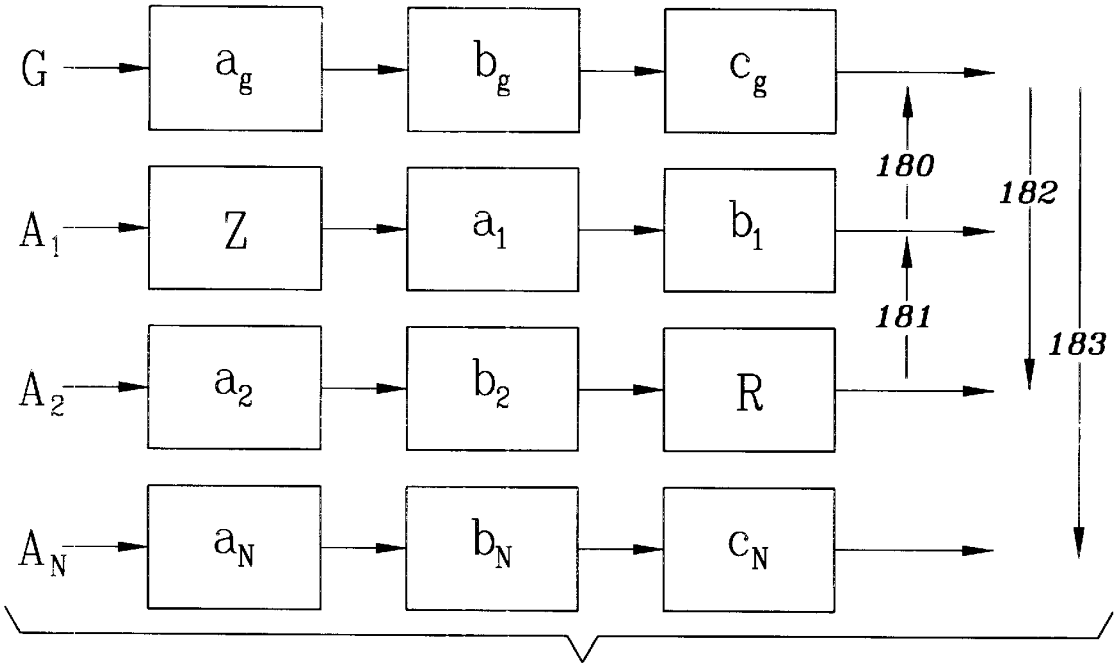
FIG. 11 is a graphic representation of an N-Way Swap Operation in accordance with the present invention.
Figure 12:
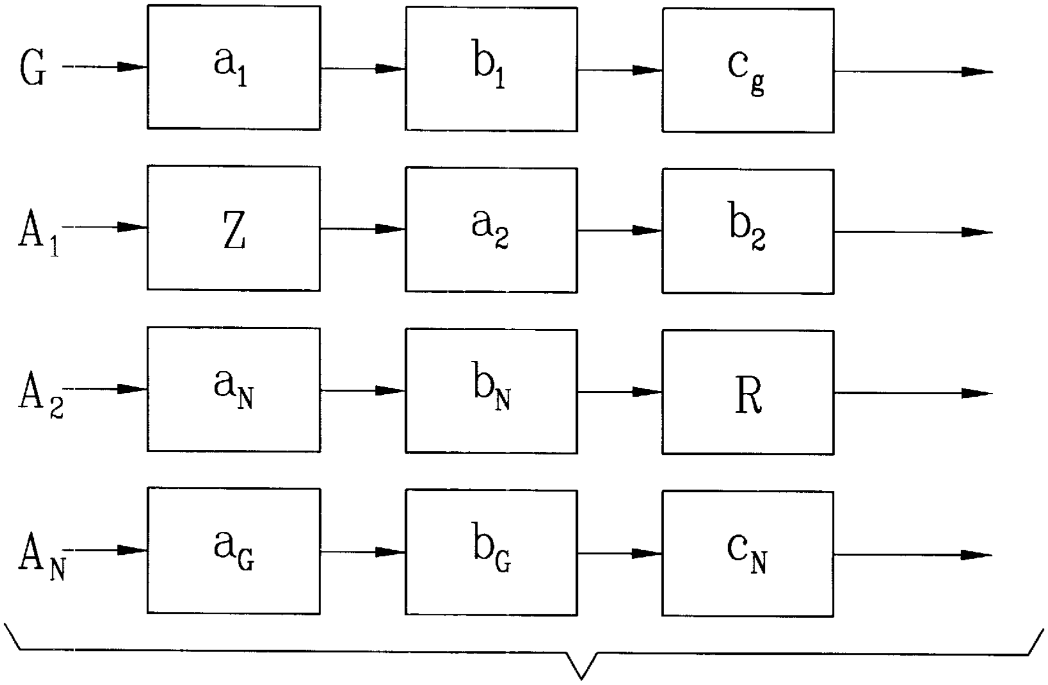
FIG. 12 is a graphic representation of a pair of Available Aircraft Routes and a Grounded Aircraft Route which have been reconfigured through use of an N-Way Swap Operation.

FIGS. 11 and 12 collectively illustrate the result of Tertiary Operations where two Available Aircraft may be used to repair a Grounded Aircraft Route. More particulary, Tables XXV and XXVI below are the gFeas and aFeas tables, respectively, which are created in an N-Way Swap among G, $A_1$, $A_2$ and $A_N$ to repair G.

TABLE XXV (gFeas)

| GH | GT | Idx | AH | aT |
|---|---|---|---|---|
| 0 | 1 | 1 | 1 | 2 |

TABLE XXVI (aFeas)

| GH | GT | Idx | AH | aT |
|---|---|---|---|---|
| 0 | 1 | 1 | 1 | 2 |
| 0 | 1 | 2 | 0 | 1 |
| | | . | | |
| | | . | | |
| | | . | | |
| 0 | 1 | N | 0 | 1 |

Referring to FIG. 11, a Three-Way Swap Operation among a Grounded Aircraft Route G, and two Available Aircraft Routes $A_1$ and $A_2$ may occur to obtain the result illustrated in FIG. 12. More particularly, subroutes $a_1$ and $b_1$ of $A_1$ may be moved to subroute positions one and two of G as indicated by arrow 180, subroutes $a_2$ and $b_2$ of $A_2$ may be moved to subroute positions two and three of $A_1$ as indicated by the arrow 181, and subroutes $a_g$ and $b_g$ of subroute G may be moved to subroute positions one and two of $A_2$ as depicted by arrorw 182.

When n Available Aircraft are used to repair a Grounded Aircraft Route, a solution may be to move $a_N$ and $b_N$ of $A_N$ into the positions of the $a_{N-1}$ and $b_{N-1}$ of $A_{N-1}$, and continue the subroute movement upward through $A_2$, $A_1$, and G so that $A_1$, $A_2$, and G are as depicted in FIG. 12. In this case, however, the $a_g$ and $b_g$ subroutes of G are moved into the $a_N$ and $b_N$ positions of $A_N$ as indicated by arrow 183 of FIG. 11.

By way of further encapsulation of the teachings of this specification, the following Table XXVII, which relates to FIGS. 5A and 5B, denotes the Binary Operations which are analyzed in building the tables necessary for execution of Tertiary Operations, and the table(s) that can be generated from those operations.

TABLE XXVII

| Binary Operations | Tables Generated |
|---|---|
| Move | Grounded Feasible Move Table |
| Move And Cancel From Target | Standby Available Feasible Move And Cancel Table |
| Swap | Available Feasible Swap Table<br>Grounded Feasible Swap Table |
| Move And Cancel From Source | Standby Grounded Feasible Move And Cancel Table |
| Swap And Cancel From Target | Swap And Cancel Available Feasible Swap Table<br>Standby Available Feasible Table<br>Swap And Cancel Available And Second Feasible Table |
| Swap And Cancel From Source | Swap And Cancel Grounded Feasible Table<br>Standby Grounded Feasible Table |
| Swap And Cancel From Source And Target | Swap And Cancel Available And Grounded Feasible Table |

The following Table XXVIII, which relates to FIG. 4, denotes the Tertiary Operations that are performed, as well as the two tables that are used in the execution of each Tertiary Operation. The two fields, Table 1 and Table 2, denote the order in which one table is used with respect to the other. For each record entry (row) in Table 1, a search is made for the matching key fields in each record entry (row) in Table 2, and if a matching entry is found, a new Grounded Aircraft Route, a new first Available Aircraft Route, and a new second Available Aircraft Route are generated from the fields in each of the tables.

TABLE XXVIII

| Tertiary Operation | Table 1 | Table 2 |
|---|---|---|
| Three-Way Swap | Grounded Feasible Swap Table | Available Feasible Swap Table |
| Three-Way Move With Available Cancel And Standby | Standby Available Feasible Move And Cancel Table | Grounded Feasible Move Table |
| Three-Way Swap With Available Cancel And Standby | Standby Available Feasible Table | Grounded Feasible Move Table |
| Three-Way Move With Grounded Cancel And Standby | Standby Grounded Feasible Move And Cancel Table | Grounded Feasible Move Table |
| Three-Way Swap With Grounded Cancel And Standby | Standby Grounded Feasible Table | Grounded Feasible Move Table |
| Three-Way Swap With Move | Grounded Feasible Move Table | Available Feasible Swap Table |
| Three-Way Swap The Dw Way | Grounded Feasible Swap Table | Available Feasible Swap Table |
| Three-Way Swap And Cancel Available And Grounded | Swap And Cancel Available And Grounded Feasible Table | Available Feasible Swap Table |
| Three-Way Swap And Cancel Available And Second Operation | Swap And Cancel Available And Second Feasible Table | Swap And Cancel Feasible Swap Table |
| Three-Way Swap And Cancel Available Operation | Swap And Cancel Available Feasible Table | Available Feasible Swap Table |
| Three-Way Swap And Cancel Grounded Operation | Swap And Cancel Grounded Feasible Table | Available Feasible Swap Table |

While the invention has been described in connection with a limited number of embodiments, it will be appreciated that many variations, modifications and other applications of the invention may be made.

What is claimed is:

1. An automated, real-time aircraft optimization system for generating multiple solutions to repair disruptions in aircraft routes, which comprises:

a memory system having stored therein Binary Operation states representing all time and space feasible Binary Operations conducted on a Grounded Aircraft Route and plural Available Aircraft Routes, and time and space feasibility tables generated from said states;

an optimization server receiving an aircraft problem specification having flight information for said Grounded Aircraft Route, and said plural Available Aircraft Routes which may be used to form a solution to repair said Grounded Aircraft Route; and a microprocessor in electrical communication with said memory system and said optimization server, and receiving said Binary Operation states and said time and space feasible tables from said memory system, and said flight information from said optimization server to build said time and space feasible tables from said Binary Operation states, and perform Tertiary Operations related to said feasible tables on said Grounded Aircraft Route and said plural Available Aircraft Routes to repair said Grounded Aircraft Route.

2. The system of claim 1, wherein said aircraft routes comprise said Grounded Aircraft Route and N Available Aircraft Routes, where N is any whole number greater than or equal to 3.

3. The system of claim 1, wherein said feasible tables are generated from values of aFeas and gFeas determined from said Binary Operations.

4. The system of claim 1, wherein said Tertiary Operations include a Three-Way Swap Operation.

5. The system of claim 1, wherein said Tertiary Operations include one or more of a Three-Way Move With Available Cancel And Standby Operation, a Three-Way Swap With Available Cancel And Standby Operation, a Three-Way Move With Grounded Cancel And Standby Operation, a Three-Way Swap With Grounded Cancel And Standby Operation, a Three-Way Swap With Move Operation, a Three-Way Swap The Dw Way Operation, a Three-Way Swap And Cancel Available And Grounded Operation, a Three-Way Swap And Cancel Available And Second Operation, a Three-Way Swap And Cancel Available Operation, and a Three-Way Swap And Cancel Grounded Operation.

6. A method for repairing a Grounded Aircraft Route through Tertiary Operations performed on said Grounded Aircraft Route and plural Available Aircraft Routes, which comprises the steps of:

storing Binary Operation states representing all time and space feasible Binary Operations conducted on said Grounded Aircraft Route and said plural Available Aircraft Routes;

generating feasible table pairs from gFeas and aFeas values determined from said Binary Operations; and performing Tertiary Operations, for which said feasible table pairs have data entries, on said Grounded Aircraft Route and said plural Available Aircraft Routes.

7. The method of claim 6, wherein said plural Available Aircraft Routes are three in number.

8. The method of claim 6, wherein said plural Available Aircraft Routes are four in number.

9. The method of claim 6, wherein said plural Available Aircraft Routes are N in number, where N is any whole number greater than or equal to 3.

10. The method of claim 6, wherein said Tertiary Operation is Three-Way Swap Operation.

11. The method of claim 6, wherein said Tertiary Operation is an N-Way Swap Operation.

12. The method of claim 6, wherein said Tertiary Operation is one of a Three-Way Move With Available Cancel And Standby Operation, a Three-Way Swap With Available Cancel And Standby Operation, a Three-Way Move With Grounded Cancel And Standby Operation, a Three-Way Swap With Grounded Cancel And Standby Operation, a Three-Way Swap With Move Operation, a Three-Way Swap The Dw Way Operation, a Three-Way Swap And Cancel Available And Grounded Operation, a Three-Way Swap And Cancel Available And Second Operation, a Three-Way Swap And Cancel Available Operation, and a Three-Way Swap And Cancel Grounded Operation.

13. The method of claim 6, wherein said feasible table pairs include two of a Grounded Feasible Swap Table, an Available Feasible Swap Table, a Standby Available Feasible Move And Cancel Table, a Grounded Feasible Move Table, a Standby Available Feasible Table, a Standby Grounded Feasible Move And Cancel Table, a Standby Grounded Feasible Table, a Swap And Cancel Available And Grounded Feasible Table, a Swap And Cancel Available And Second Feasible Table, a Swap And Cancel Available Feasible Table, and a Swap And Cancel Grounded Feasible Table.

* * * * *